(12) United States Patent
Endras et al.

(10) Patent No.: US 10,997,413 B2
(45) Date of Patent: May 4, 2021

(54) METHOD AND SYSTEM FOR OBTAINING VEHICLE TARGET VIEWS FROM A VIDEO STREAM

(71) Applicant: NthGen Software Inc., Toronto (CA)

(72) Inventors: Mark Endras, Toronto (CA); Li Zhang, Toronto (CA); Yunlei Zhang, Toronto (CA); Nataliya Portman, Toronto (CA); Akbar Nurlybayev, Toronto (CA)

(73) Assignee: NthGen Software Inc., Toronto (CA)

( * ) Notice: Subject to any disclaimer, the term of this patent is extended or adjusted under 35 U.S.C. 154(b) by 84 days.

(21) Appl. No.: 16/174,772

(22) Filed: Oct. 30, 2018

(65) Prior Publication Data

US 2019/0294878 A1    Sep. 26, 2019

Related U.S. Application Data

(60) Provisional application No. 62/647,457, filed on Mar. 23, 2018.

(51) Int. Cl.
*G06K 9/00* (2006.01)
*G06T 7/00* (2017.01)

(52) U.S. Cl.
CPC ..... *G06K 9/00664* (2013.01); *G06K 9/00718* (2013.01); *G06T 7/0002* (2013.01);
(Continued)

(58) Field of Classification Search
CPC .......... G06K 9/00664; G06K 9/00765; G06K 9/00718; G06T 7/70; G06T 7/0002;
(Continued)

(56) References Cited

U.S. PATENT DOCUMENTS

| 8,712,893 B1 | 4/2014 | Brandmaier et al. |
| 9,002,719 B2 * | 4/2015 | Tofte ........................ G06F 30/13 |
| | | 705/4 |

(Continued)

FOREIGN PATENT DOCUMENTS

CN            1967565 A         5/2007

OTHER PUBLICATIONS

"NAAA Vehicle Condition Grading Scale"—Wayback Machine indicates date at least on Sep. 23, 2017.

(Continued)

*Primary Examiner* — Pankaj Kumar
*Assistant Examiner* — Timothy R Newlin
(74) *Attorney, Agent, or Firm* — Lempia Summerfield Katz LLC

(57) ABSTRACT

A system and method for obtaining target views of a vehicle is disclosed. A seller of a vehicle may seek to obtain one or more target views of the vehicle. To obtain the target views, the user may use a smartphone with an app that accesses the video stream while the user walks around or inside the vehicle. When the app identifies a frame in the video stream as one of the target views sought, the app tags the frame as an image of one of the target views. Further, the user may provide additional input, such as voice input (as part of the video stream) or manual taps on the touchscreen of the smartphone. The additional input may be used for damage assessment or sentiment analysis of the vehicle.

26 Claims, 27 Drawing Sheets

(52) U.S. Cl.
CPC ............... *G06T 2207/10016* (2013.01); *G06T 2207/30248* (2013.01)

(58) Field of Classification Search
CPC ............. G06T 7/73; G06T 2207/30248; G06T 2207/10016
See application file for complete search history.

(56) References Cited

U.S. PATENT DOCUMENTS

| | | | |
|---|---|---|---|
| 9,218,698 B2* | 12/2015 | Ricci | ................. B60H 1/00742 |
| 9,824,453 B1* | 11/2017 | Collins | ................. G06Q 40/08 |
| 9,886,771 B1* | 2/2018 | Chen | ................... G06F 3/04845 |
| 10,089,396 B2 | 10/2018 | Endras | |
| 2003/0036964 A1 | 2/2003 | Boyden et al. | |
| 2004/0142678 A1* | 7/2004 | Krasner | ................. G08G 1/205 455/404.2 |
| 2008/0052134 A1* | 2/2008 | Nowak | ................... G06Q 10/10 705/4 |
| 2008/0306996 A1* | 12/2008 | McClellan | ............. G06Q 10/06 |
| 2012/0239530 A1 | 9/2012 | Varadarajan et al. | |
| 2012/0297337 A1* | 11/2012 | St. Denis | ............... G08G 1/168 715/810 |
| 2014/0104379 A1 | 4/2014 | Glasgow | |
| 2014/0201022 A1* | 7/2014 | Balzer | ................... G06T 7/0002 705/26.4 |
| 2014/0277916 A1* | 9/2014 | Mullen | ................. G07C 5/008 701/31.4 |
| 2015/0025993 A1 | 1/2015 | Kiglies et al. | |
| 2015/0264255 A1 | 9/2015 | Budihal | |
| 2015/0287130 A1* | 10/2015 | Vercollone | ........... G06K 9/2081 705/4 |
| 2016/0012539 A1 | 1/2016 | Gorelov | |
| 2016/0140778 A1* | 5/2016 | Bailly | .................... G07C 5/008 348/148 |
| 2017/0148102 A1* | 5/2017 | Franke | ............... G06Q 30/0278 |
| 2017/0293894 A1* | 10/2017 | Taliwal | ................ G06K 9/6201 |
| 2018/0012350 A1* | 1/2018 | Gangitano | ............ H04N 7/188 |
| 2018/0293806 A1* | 10/2018 | Zhang | ................... G07C 5/008 |
| 2019/0012394 A1 | 1/2019 | Endras | |
| 2019/0064836 A1* | 2/2019 | Buttolo | ................... G06T 11/60 |
| 2019/0095877 A1* | 3/2019 | Li | .......................... G06Q 10/20 |
| 2020/0034958 A1* | 1/2020 | Campbell | .............. G06Q 10/10 |

OTHER PUBLICATIONS eBay Motors—How to Sell a Vehicle—Take Photographs, Jan. 19, 2009, 3 pages.
Koch, Forms, usability, and the W3C DOM, May 30, 2003, 8 pages.
Tom92909, How do you make a Dynamic Form auto populate fields? 2009, 3 pages.
Tripathi, Getting a input field populated on entering the value in one Input field, 2009, 3 pages.
VINtrack EZ OBD Full Vin Upgrade (Item #EZOBD), Jan. 12, 2012, 3 pages.

* cited by examiner

METHOD AND SYSTEM FOR OBTAINING VEHICLE TARGET VIEWS FROM A VIDEO STREAM

REFERENCE TO RELATED APPLICATION

This application claims the benefit of U.S. Provisional Application No. 62/647,457 filed on Mar. 23, 2018, the entirety of which is incorporated by reference herein.

BACKGROUND

Typically, when selling a vehicle, certain target views of the vehicle are obtained. For example, target views directed to the front, side, back, interior driver side, etc. may be obtained in order to describe the vehicle for sale.

DETAILED DESCRIPTION

Figure 1:
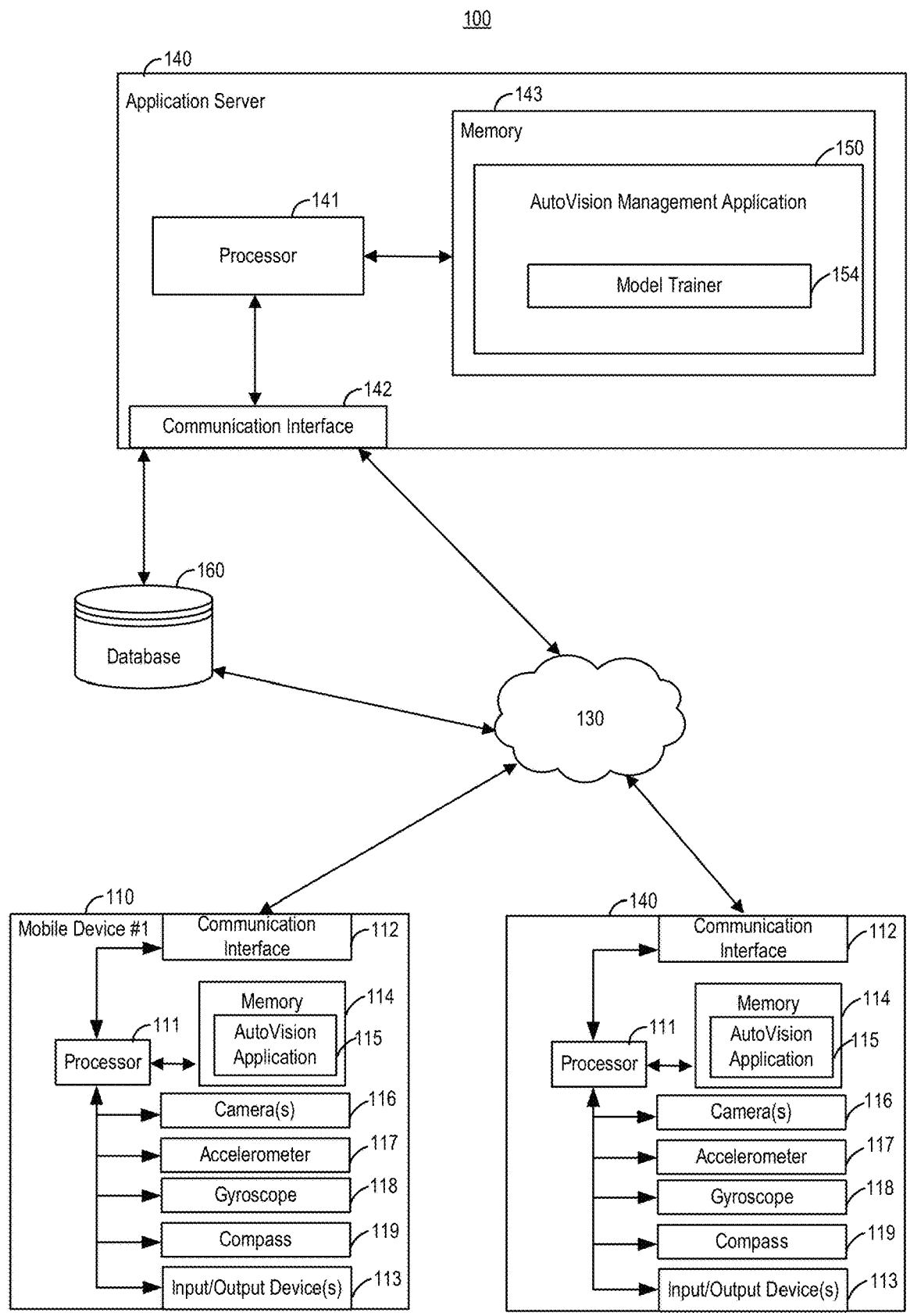
FIG. 1 illustrates an exemplary system for training and using a vehicle application, the vehicle application for obtaining target views and for inputting damage assessment of the vehicle.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

Various types of goods may be sold, such as vehicles (e.g., cars, trucks, boats, or the like). In selling the vehicles, a seller may wish to obtain one or more images of target views of the vehicle. For example, a seller may wish to obtain views inside the vehicle (e.g., the dashboard, steering wheel, odometer, navigation system, etc.) and/or views outside the vehicle (e.g., front, driver side, passenger side, back, tire, front perspective view, wheels, rims, manufacturing ornament on the hood, etc.). Obtaining these images may be time-intensive. In this regard, in one implementation, a mobile device may move relative to the vehicle (such as around the vehicle and/or inside the vehicle), with the mobile device generating a series of images. For example, the mobile device may comprise a smartphone or the like, with the smartphone activating its video function in order to generate a series of frames, such as in the form of a video stream as the smartphone moves relative to the vehicle. As discussed below, a software tool, such as an app, executed on the smartphone may access the live video stream, and may make inferences about the target views for some, almost all, or all frames in a live stream of image data. In one implementation, these inferences are measured by the probabilities of seeing one, some, or each target view, with the app labeling one or more video frames for the different views (e.g., front view, driver side view, etc.) with the highest probability. For example, the analysis of a respective frame may determine a first probability that the frame comprises an image of the front of the vehicle, a second probability that the frame comprises an image of the driver side of the vehicle, etc., with the system, based on the determined probabilities, labelling to tagging the respective frame as comprising an image of a part of the vehicle. In practice, an end user may walk around the vehicle, such as clockwise or counter-clockwise relative to the vehicle, in order to perform automated vehicle picture taking by the AutoVision app. During this process, the user's mobile device moves relative to the vehicle. Thus, in one implementation, the user need not move relative to the vehicle in a predetermined manner (e.g., only in a clockwise motion relative to the vehicle); instead, the user may move randomly about and/or inside the vehicle, with the AutoVision app analyzing frames in the accessed video stream, thereby obtaining the different views of the vehicle. Alternatively, a drone, with image capture functionality, may move relative to the vehicle.

In addition, damage to the vehicle may be identified. For example, a user activates an application in order to obtain photos of target views of the vehicle along with its damages. In one implementation, the application may enter damage input mode automatically (e.g., responsive to obtaining a predetermined view of the vehicle) and/or responsive to some action of the user (e.g., the app detecting, such as via a sensor on the smartphone or analysis of the video stream, that the user has moved closer to the vehicle; the user tapping the screen of the smartphone to indicate an input of damage). The application may sense additional user input (e.g., such as audio input and/or manual input via the display screen of the smartphone) in order to further define the damage to the vehicle. In this regard, the application may be configured to: (i) obtain images of predetermined target views of the vehicle; and/or (ii) input damage assessment (and in turn amend the images of the target view obtained with a marker (or icon) with the assessed damage).

As discussed in further detail below, the identification of a view of the vehicle (e.g., the front view of the vehicle, the driver side view of the vehicle, the interior dashboard of the vehicle) may impact the damage analysis. In particular, responsive to determining that the application has identified a specific view of the vehicle, the identified specific view may be used in order to determine one or more aspects of the damage (e.g., location of the damage and/or type of damage). As one example, responsive to identifying that a frame is the front view of the vehicle, damage analysis subsequent to the identification (such as a certain time period, e.g., 30 seconds, after identification) may be impacted by the identification of the specific view. In one example, machine learning may be correlated to specific views of the vehicle. In particular, the machine learning may focus on damage associated with a particular view of the vehicle. In one particular example, the machine learning may focus its learning on the front view of the vehicle with damage associated with the hood or the windshield. Responsive to the application determining that the frame most recently obtained is of the front view of the vehicle, the application may access the machine learning model associated with the front view of the vehicle in order to analyze damage associated with the front view of the vehicle (e.g., dents in the hood and/or cracks in the windshield). In another particular example, the machine learning may focus its learning on the interior seats of the vehicle with damage associated with the seats of the vehicle (e.g., tears in the seats or distressing of the seats). Responsive to the application determining that the frame most recently obtained is of the front seat in the vehicle, the application may access the machine learning model (such as a damage model) associated with the seats of the vehicle in order to analyze damage associated with the seats of the vehicle (e.g., tears in the fabric, distressing of the seats, etc.). In another example, identification of a specific view may be correlated to a set of views, with the damage analysis being dependent, at least in part, on the correlated set of views. As one example, the application may identify that the frame most recently obtained is of the driver side view of the vehicle. Based on this identification, the application may identify that the view is associated with an exterior of the vehicle. In this regard, the identification of the driver side view may be correlated to the exterior set of views. Based on this correlated exterior set of views, the application may perform its damage analysis. For example, the machine learning model may be based on the correlated set of view, such as identifying damage associated with the exterior of the vehicle (e.g., dents, scratches, rust, chips in paint, etc.) and identifying damage associated with the interior of the vehicle (e.g., tears in fabric/leather, cleanliness of interior, etc.). In this regard, responsive to the application determining that the view is an exterior view, the machine learning algorithm narrows the potential damage associated with the view (such as not examining for a seat tear). Conversely, responsive to the application determining that the view is an interior view, the machine learning algorithm narrows the potential damage associated with the view (such as not examining for rust).

In one implementation, the damage analysis may be dependent, at least in part, on the identification of a specific view in certain circumstances. As one example, the dependence of the damage analysis on the specific view is based on a sequence in which the application tags images for the specific views. In particular, the application may seek to obtain images for a first specific predetermined view and a second specific predetermined view. Responsive to the application identifying or tagging the image for the first specific predetermined view but before identifying or tagging the image for the second specific predetermined view, the application's damage analysis may be dependent, at least in part, on the first specific predetermined view. In this regard, the timing of the dependence of the damage analysis is, in turn, dependent on the sequence of predetermined views tagged.

In one implementation, the detection of target view of the vehicle, such as interior target views and/or exterior target views, may use a machine learned model. In particular, in order to recognize different vehicle views from the video stream, such a model may be trained on a server, which may be used by the mobile device. In a specific implementation, automatic recognition of major vehicle views (interior and exterior) may rely on mobile iOS compatible Deep Neural Network models trained on frames extracted from videos of these target views, and images collected for vehicle condition reports. Alternatively, recognition of major vehicle views (interior and exterior) may rely on mobile Android compatible Deep Neural Network models. As discussed further below, the machine learning models may be generated on a device separate from the smartphone (such as a server) and may be downloaded to the smartphone for use by the application executed on the smartphone.

One example of a neural network model is a convolutional neural network model, which may comprise a feeforward neural network that may be applied to analyzing visual imagery, such as associated with the damage analysis discussed herein. The system may feed images in order for the model to "learn" the features of an image with a certain perspective (such as the front view). In one implementation, the deep learning process may entail supplying images (e.g., more than 50 thousand images) for a specific view (e.g., driver side) in order to model the feature(s) indicative of a driver side image. This process may be repeated for all views.

In one implementation, the models may be trained to identify one or more features of the different views (e.g., the front view, the driver side view, etc.) based on images collected for the different views. For example, for a certain type of model (e.g., a 2015 Toyota Camry), images of the certain type of model for the different views may be input in order to train the model. As another example, for a certain type of vehicle (e.g., 4-door midsize vehicle), images of the certain type of vehicle for the different views may be input in order to train the model. Alternatively, or in addition, the system may train the model to identify damage. In one implementation, the model may be trained to identify damage for different specific views (e.g., front view, driver side view, interior dashboard view, etc.). In this example, images for the specific view with different types of damage may be input to train the model. Alternatively, or in addition, images for the specific view without damage may be input to train the model. In the example of the front view, images with damage (e.g., rust, dents, scratches, cracks in windshield) for the front view of the specific vehicle (e.g., the 2015 Toyota Camry) may be input. In the example of the interior view of the seats, images with damage (e.g., tears) for the specific vehicle (e.g., the 2015 Toyota Camry) may be input. In an alternate implementation, the model may be trained to identify damage for different sets of views (e.g., exterior views, interior views, etc.). In this example, images for the different sets of views with different types of damage may be input to train the model. Alternatively, or in addition, images for the different sets of views without damage may be input to train the model. In the example of the exterior views, images with damage (e.g., rust, dents, scratches, cracks in windshield) for the exterior views of the specific vehicle (e.g., the 2015 Toyota Camry) may be input. In the example of the interior views, images with damage (e.g., tears) for the specific vehicle (e.g., the 2015 Toyota Camry) may be input.

For automatic view recognition, a deep Neural Network (DNN) Model may be trained on a large dataset of images (500,000 images) on a cloud computing platform (such as a machine learning (ML) engine). Prior to generating such a model, extracted video frames and other vehicle view images may be sorted into the following buckets: (1) images where the predicted labels match the labels in metadata for those images; or (2) images where the predicted labels do not match the labels in metadata for those images. Preprocessing in this manner may significantly improve the model by providing examples of vehicle types or backgrounds that have not been seen previously.

In a specific implementation, data preparation for training may be completed via a video processing pipeline that performs real-time video data streaming and batch processing of multimedia images (such as coming from dealers and capture representatives on a daily basis) through a series of filters that first detect repeated videos, blurry and "not-a-car" images of views. Thereafter, the view recognizer component of the pipeline may further sort vehicle view images and extracted frames into the following categories: healthy (e.g., predicted view=given view with confidence level greater than 50%); mislabeled (predicted view given view); and undefined (e.g., predicted view=given view with confidence level less than 50%). The combination of images from the mislabeled category (whose labels are validated by human observers) and from the healthy category may form the training dataset. After training of the model, the model may be validated on a test set of images in order to confirm no (or negligible) loss of precision over time.

In one implementation, a general detection methodology may be used in which: an image is taken as input; checked to determine if the image contains a vehicle; and if the image does contain a vehicle, return one of a plurality of labels for classification. As one example, one of nine labels, corresponding to different views of the vehicle, may be used. Fewer or greater numbers of labels are contemplated. Further, the pipeline may include an image preprocessing step to determine that the main subject of the image is in focus.

In one implementation, the pipeline may include: Image→Motion Detection Algorithm→Vehicle Presence Classifier→View Recognizer. For example, the motion detection algorithm may determine whether the camera device on the mobile device is sufficiently steady. In particular, the mobile device may use an accelerometer resident on the mobile device to determine if there is excessive jitter. This acts as a preliminary assessment. If excessive jitter is present, processing reverts to obtaining additional images for motion detection and an output (e.g., visual and/or aural) via the mobile device may indicate that the camera device is being excessively moved. For example, the smartphone may output on the smartphone display an indication of excessive jitter. If there is no excessive jitter, the mobile device may generate an output (e.g., visual and/or aural) to user. As discussed further below, in response to determining that there is not excessive jitter, "STEADY" is output on the screen. Further, the view recognizer may be activated in order to identify the view.

The Vehicle Presence Classifier, which may sense the presence of a vehicle in the respective frame, may be based on a neural network architecture, which may be trained using transfer learning technique on a combination of condition report multimedia images and images not containing vehicles. The View Recognizer Classifier, which may sense a particular view of a vehicle in the respective frame, may likewise be based on a neural network architecture, and may return labels for the different views of the vehicle. In this regard, the mobile device, such as a smartphone, may obtain real-time camera video frames as input, check if a vehicle is in the frame and if so, returns one of a plurality of labels that the pre-trained models may classify.

In one implementation, after the target view has been captured (e.g., driver side of vehicle), the user may take one or more additional actions in order to input information on damage with respect to the target view that has been captured. In practice, after the target view has been captured, the application may enter damage input mode, in which input from the user may be identified by the application as damage to the vehicle. As discussed above, the entry of the application into damage input mode may be based on input from the user. As one example, the user may provide explicit input, such as a tap on the screen of the smartphone or an audio input indicating that the user has identified damage (e.g., identifying that the user has said a predetermined word, such as "damage", "rust", "scratch", "crack", or the like), in order for the application to enter damage input mode. As another example, the user may provide implicit input, such as the user moving closer to the vehicle. The application may determine, after the predetermined view of the vehicle has been identified (and optionally the user being notified that the predetermined view of the vehicle has been identified), that the user has moved closer to the vehicle. The application may determine whether the user has moved closer to the vehicle in one of several ways. In one way, the application may access sensor output, such as sensor output from an accelerometer on the smartphone, to determine whether the user has moved closer to the vehicle. In particular, the application may access the accelerometer sensor output when the predetermined view of the vehicle has been identified and monitor the accelerometer sensor output to determine whether, relative to the accelerometer sensor output when the predetermined view of the vehicle has been identified, whether the user has moved closer to the vehicle. In another way, the application may analyze the video stream to determine whether the user has moved closer to the vehicle. For example, the application may determine, based on image analysis whether a current image in the video stream is a subpart of the image recently obtained as the predetermined view of the vehicle. Responsive to the application determining that the user has moved closer to the vehicle, the application may enter damage input mode to input damage with regard to the most recently captured predetermined view of the vehicle.

In another implementation, after the target view has been captured, the application may automatically enter damage input mode. For example, after the application identifies the frame for the driver side of the vehicle, the application may automatically enter damage input mode to input damage for the driver side of the vehicle.

Further, the application may exit damage input mode upon a new target view being captured. For example, after the application identifies to the user that the target view has been captured, the user may move closer to the vehicle and tap the screen to provide input of the damage. In one implementation, at the time of input by the user, an augmented reality (AR) session may be underway so that the tap of the screen may be translated into 3-dimensional space.

In particular, upon activation of the application, the AR session may be activated. Upon activation of the AR session, the position of the mobile device (e.g., the camera) may be initialized in 3-dimensional space. Further, points (such as hundreds of points (e.g., at least 100 points)) in the camera may be determined relative to the initial position of the camera. Upon movement of the camera, the position of the camera may be updated, and the location of the points in the image of the camera may likewise be updated to indicate changes.

For example, after the exterior view image and/or interior view image has been captured, the application may input damage associated with the view image taken. As discussed above, in one way, a user may approach the location of the damage and tap the screen. The application interprets the tap as the user identifying the damage in the image. For example, at the time when the exterior view image has been taken (in the AR session), the 3D coordinate system has been established automatically by AR algorithm. Thus, the user tap is translated into the 3D coordinates of the center of the tapped area and marked by an indicator (e.g., a red circle), as discussed further below. In one implementation, the user tap results in the application identifying a specific location on the vehicle (e.g., the driver side door, a subpart of the driver side door (the lower half of the driver side door), specific coordinates, etc.). Responsive to identifying the location, in a first specific implementation, the application may analyze the location in order to determine a type of damage (e.g., analyze the image in and around ascribed to the location in order to determine whether there is a scratch, dent, etc. on the driver side door). Responsive to identifying the location, in a second specific implementation, the application may output one or more possibilities of damage for the user to select. As another example, the application may analyze another input of the user, such as audio input, in order to determine whether there is damage present. In particular, the application may analyze the audio portion of the video stream in order to identify keywords (e.g., "rust"; "dent"; "3 inch scratch"; etc.), and responsive to the identification of the keyword, analyze the image obtained. As one example, responsive to identifying "rust" in the audio portion, the application may analyze the image in order to identify and tag where in the image rust is present. In one implementation, the application may access the machine learning model dependent on the identified keyword (e.g., access the section of the machine learning model directed to rust damage). As another example, responsive to identifying "3 inch scratch", which includes both the identification of the damage ("scratch") and the severity of the damage ("3 inch"), the application may access the machine learning model dependent both on the identified keyword (e.g., access the section of the machine learning model directed to scratch damage) and on the severity of the damage (e.g., confirm whether the scratch is equal to 3 inches, less than 3 inches, or more than 3 inches). In this regard, the application does not necessarily need to wait for the user to approach the vehicle. Thereafter, the 3D coordinates of the marked point are projected back to the image plane of the exterior view (e.g., the photo of target view which has been already taken).

In that regard, the AR session has the approximate location of the damage in 3-dimensional space, which is the point being marked and included in to: (1) update the video stream output to the user; and/or (2) modify the target image (e.g., with an icon), as discussed below.

Thus, one or more aspects of the damage (e.g., location and/or type of damage) may be determined. In one implementation, the one or more aspects of the damage may be determined based on a combination of user input and automatic analysis. For example, the location may be determined based on one or both of the user input (e.g., tap on the screen and/or user audio) and/or the application identifying a predetermined view (e.g., the application driver side view). Responsive to determination of the location of the damage, the type of damage may be determined. In one implementation, the type of damage may be determined solely based on user input, solely based on automatic determination, or based on a combination of user input and machine analysis. For example, based on a tap on the user screen, the application may output a set of potential types of damage from which the user to select. As another example, based on the tap on the user screen, the application may automatically determine the type of damage at the location associated with the tap. As still another example, based on the tap on the user screen, the application may analyze the potential damage at the location associated with the tap in order to present a narrower set of potential types of damage from which the user to select.

Thus, the user's tapping (or other type of input, such as audio input) may indicate to the application that there is damage to the vehicle. As one example, tapping results in superimposing (at least temporarily) a red dot in 3D space. As another example, the audio input may result in the application superimposing (at least temporarily) a red dot in 3D space. The red dot (or other marker) may thereafter be changed to a different icon based on further input (e.g., after inputting the information via the multi-level menu, damage location along with the damage type are added to the icon; based on audio input analysis). For example, after the multi-level menu, the red dot may change to indicate a "scratch door" (a scratch on the door). Further, a number may be used to indicate the sequence of damage items input (e.g., first damage item identified as "1"). Tapping further results in one or more menus popping up, including: a first-level menu with a list of vehicle parts for that target view of the car (e.g., the application can correlate for each target view a listing of potential parts in the view); in this way, the potential parts listed are only those that are relevant to that view. The user may select one of the potential parts in the first-level menu followed by a type of damage selected from a second-level menu that lists damages associated with the part selected in the first-level menu.

Another type of input comprises audio input. As discussed above, the audio input may be used to indicate damage to the vehicle. For example, the audio input may be analyzed, such as identifying keywords indicative of damage to the vehicle (e.g., "rust", "dent", "scratch", etc.) and/or parts of the vehicle (e.g., "driver door"; "front fender"; "rear fender"; etc.). Alternatively, or in addition, the audio input may indication condition or options of the vehicle separate from damage. For example, the audio input may be analyzed to identify keywords, such as assessment terms (e.g., "good condition", "great paint job") or such as options associated with the vehicle (e.g., "upgraded engine"; "turbo"; "V8").

In one implementation, responsive to the input, the application may analyze a frame from the video stream (such as the frame correlated in time to when the input was received).

For example, responsive to audio input indicative of damage, the application may analyze the frame correlated to when the audio input was received to determine whether the damage is present (e.g., responsive to identifying "rust" in the audio stream, analyzing the frame for indications of rust). Alternatively or in addition, responsive to the input, the application may use the input for qualitative analysis, such as sentiment analysis, discussed further below. Further, responsive to the input (such as the audio input), the application may seek to obtain an additional view of the vehicle. For example, responsive to identifying an option of the vehicle (e.g., "spoiler"), the application may add another predetermined view and search the video stream for a frame that matches the criteria for a spoiler present in the frame. In this regard, the application may dynamically change based on input (such as audio input) from the user.

In one implementation, the input of damage information, such as by the user inputting information on damage, may result in the video streams being modified and/or the target view being modified. For example, the tap indicating damage to the vehicle may modify the video stream (as shown in the display of the mobile device) such that a tag (or icon) is placed in 3-D space, superimposed on the video stream at the location that was identified by the user as to where the damage is on the vehicle. Therefore, when the user continues to move around the vehicle, the tag will likewise move in 3-D space (while being anchored to the user specified location). The tag may be a generic tag (independent of the type of damage), or may be tailored to the type of damage, as discussed above. Further, the target view may be subject to modification, such as by placing a tag (or icon) on the still image of the target view. As another example, the audio input indicating damage to the vehicle may modify the video stream such that a tag (or icon) is placed in 3-D space, superimposed on the video stream at the location that was identified by the user as to where the damage is on the vehicle. In particular, responsive to the application identifying one or more keywords, such as "rust", the application may analyze the frame for the rust, and tag in 3-D space where the rust is identified.

Therefore, the placement of the tag (or icon) in the image and/or in 3-D space may be based on various forms of input, such as a physical tapping of the touchscreen and/or audio input from the user. In one implementation, the tag (or icon) may be superimposed on the image of the target view and can be selected based on the type of damage. Meta-data may be associated with the tag, such as identification of any one, any combination, or all of: (1) the part of the vehicle; (2) the type of damage; (3) the date/time of input of the information; (4) the user (or company) who input the information; or (5) video and/or audio information associated with the damage.

Separate from using at least a part of the video information (e.g., audio input and/or frames) for obtaining predetermined views of the vehicle and/or for analysis of the vehicle (e.g., audio input to assess damage and/or vehicle options), alternatively or in addition, the video information may be used for other purposes. As one example, video and/or audio information may be associated with the tag (or icon). In practice, the video and/or audio information may be played responsive to user input, such as by clicking (or hovering over) the tag (or icon). For example, someone, separate from the user, may wish to access at least a part of the video information obtained when inspecting the vehicle, such as a clip of the audio portion or a clip of the video. The application may associate the video information (e.g., the clip of the audio portion or the clip of the video) with one or both of the images of the predetermined views (e.g., the tag superimposed on an image of a predetermined view) or the 3-D video stream (e.g., the tag superimposed in 3-D space on a portion of the video stream).

With regard to the video, as the user moves about the vehicle, the application may correlate different target views with different sections of the video. In one way, a tag identifying damage to the vehicle (at a particular location/target view of the vehicle) may be associated with a part of the video. In another way, a tag identifying an option associated with the vehicle (such as a spoiler at a rear target view of the vehicle) may be associated with a part of the video. This correlation may be done in one of several ways (or in a combination of the ways listed below): (a) responsive to the software obtaining an image of a specific perspective, the software may tag the section of the video stream as being associated with the specific perspective; (b) responsive to detecting, after obtaining the image, that the user is moving closer to the vehicle, the software may tag the section of the video stream as being associated with the tag; or (c) after the user taps on the screen (to identify the damage), the software may tag that section of the video stream (e.g., starting at the tap and saving for 3 seconds thereafter; starting 1 second before the tap and saving for 3 seconds thereafter; etc.).

With regard to the audio, as the user moves about the vehicle, the application may correlate different target views with different sections of the audio (which may be taken from the video stream of the mobile device). The correlation may be similar to (a)-(c) the above, and may further include: (d) identifying in the audio stream keywords, such as "damage"; "scratch"; "rust"; "good condition"; "additional option"; etc. Identification of the keyword may then be correlated to the tag identified closest in time.

As discussed above, in one implementation, the user may provide manual input in order to identify damage to the vehicle. Alternatively, the application may operate in full automatic mode in order to identify damage to the vehicle. In particular, the application may analyze part or all of the video stream (e.g., the audio part and/or the image part) in order to identify: (1) damage location (the part of the vehicle, such as the bumper, for instance); and (2) the type of damage. For example, with regard to analyzing images in the video stream, responsive to determining that an image of the specific target view has been captured, the software may compare the image of the specific target view with a reference image of the specific predetermined perspective in order to determine whether there are any anomalies (e.g., damage) and if so, the type of damage. As another example, the software may review keywords in the audio stream in order to identify damage as well as the type of damage and/or in order to identify condition (e.g., overall good or bad condition of the vehicle) or options of the vehicle. Further, even in automatic mode, the application may output its assessment in real time so that the user can review, and potentially override, the assessment.

In an alternate implementation, the application may operate in semi-automatic mode in order to identify damage to the vehicle. In one implementation, the initial analysis may be dependent on input from the user (e.g., audio and/or tapping of the touchscreen). Responsive to the input from the user, the application may automatically analyze the vehicle (e.g., to confirm or dispute the user's assessment). In the instance that the application dispute's the user's assessment, the user may be given the option override the application's analysis. For example, in the instance that the user taps the screen and indicates damage on the vehicle (e.g., a scratch on the driver side door), the application may analyze the input in order to confirm or dispute the user's input. Responsive to confirming the user's input, the application may output confirmation of the user's input. Responsive to disputing the user's input, the application may output a request to the user to override the application's assessment. In another implementation, the initial analysis may be automatically performed by the application. The initial analysis may then be output to the user for confirmation or rejection.

In a first specific implementation, if the application is unable to determine, with a predetermined level of certainty, whether there is damage or the type of damage, the software may solicit input from the user. For example, the software may identify that the damage is present; however, the software may not necessarily distinguish between two damage types (e.g., between a scratch and crack), so that the software may flag the damage to the user and output a menu (reduced in options to be at least two potential types of damage, such as only to "rust" or "scratch") for the user to decide. The user may then be presented with the reduced options, with the user selecting one of the reduced options. In a second specific implementation, the user may identify that the damage is present, and the application may identify the damage types from the different available damage types.

In one implementation, a sentiment analysis may be performed. As discussed above, the application may receive various types of input. Based on the one or more types of input, the application may perform an analysis of the vehicle, with the analysis indicative of a condition of the vehicle. Various types of analyses are contemplated. In a specific implementation, the analysis may comprise bucketizing the condition of the vehicle, such as grading the condition of the vehicle into general buckets of "very poor condition", "bad condition", "average condition", "good condition", and "mint condition". The list of general buckets is merely for illustration purposes.

In one implementation, the analysis may comprise obtaining inputs from various sources and generating the bucketized condition of the vehicle. The inputs may comprise any one, any combination, or all of: user input (e.g., manual user input (such as tapping the touchscreen) and/or audio input comprising a user's voice); or machine generated input (such as audio input recording operation of the vehicle (e.g., the sound of the vehicle engine)). In a first specific implementation, the analysis may generally include identifying keywords in the audio input and correlating the identified keywords to a particular bucket. For example, responsive to identifying a keyword of "mint condition", the analysis may bucketize the condition of the vehicle into "mint condition". As another example, responsive to identifying a keyword(s) correlated to "mint condition" (such as "awesome" or "not a scratch", the analysis may bucketize the condition of the vehicle into "mint condition". In a second specific implementation, the analysis may specifically identify keyword(s) correlated to different view(s) of the vehicle, and based on the identified keyword(s) correlated to the different view(s), bucketize the vehicle. As one example, the keyword(s) associated with predetermined views of the exterior of the vehicle may be identified and the keyword(s) associated with predetermined views of the interior of the vehicle may be identified. The identified keyword(s) for the exterior of the vehicle may be weighted differently than the identified keyword(s) for the interior of the vehicle in order to bucketize the condition of the vehicle. In particular, the identified keyword(s) for the interior of the vehicle may be weighted greater than the identified keyword(s) for the exterior of the vehicle. As another example, the keyword(s) associated with a specific predetermined view(s) of the vehicle may be identified in order to bucketize the condition of the vehicle. In particular, the identified keyword(s) for a predetermined view of the engine may be weighted differently than the identified keyword(s) for another predetermined view of the vehicle (such as the interior).

Further, the results of the sentiment analysis may be presented in one or more ways. In one way, the results may be associated with one or both of the images of the predetermined view(s) or the 3-D video stream. As one example, responsive to the sentiment analysis identifying a general sentiment assessment, a tag or icon may be associated with one, some, or all of the images of the predetermined views and/or the 3-D video stream. As another example, responsive to the sentiment analysis identifying a specific sentiment assessment, a tag or icon may be associated with less than all of the images of the predetermined views and/or only a portion of the 3-D video stream. In a first example, responsive to an exterior sentiment assessment as to the exterior of the vehicle, one, some, or all of the images for the predetermined views of the exterior of the vehicle (but not of predetermined views of the interior of the vehicle) may be tagged with the exterior sentiment assessment. Alternatively or in addition, the 3-D stream including the exterior of the vehicle may be tagged with the exterior sentiment assessment; however, the 3-D stream including the interior of the vehicle is not tagged with the exterior sentiment assessment. As a second example, responsive to an interior sentiment assessment as to the interior of the vehicle, one, some, or all of the images for the predetermined views of the interior of the vehicle (but not of predetermined views of the exterior of the vehicle) may be tagged with the interior sentiment assessment. Alternatively or in addition, the 3-D stream including the interior of the vehicle may be tagged with the interior sentiment assessment; however, the 3-D stream including the exterior of the vehicle is not tagged with the interior sentiment assessment. As a third example, responsive to a predetermined view sentiment assessment as to a specific predetermined view of the vehicle (e.g., the engine), the images for the specific predetermined view (e.g., the engine) (but not of other predetermined views of the vehicle) may be tagged with the predetermined view sentiment assessment. Alternatively or in addition, the 3-D stream including the predetermined view of the vehicle (e.g., the engine) may be tagged with the predetermined view sentiment assessment; however, the 3-D stream including other views are not tagged with the predetermined view sentiment assessment.

Referring to the figures, FIG. 1 illustrates an exemplary system 100 for training and using a vehicle application, the vehicle application for obtaining target views and for inputting assessment (e.g. damage or sentiment assessment) of the vehicle. The system 100 includes an application server 140 configured to include the hardware, software, firmware, and/or middleware for operating the AutoVision management application 150. Application server 140 is shown to include a processor 141, a memory 143, and a communication interface 142. The AutoVision management application 150 is described in terms of functionality to manage various stages of managing the model trainer 154.

AutoVision management application 150 may be a representation of software, hardware, firmware, and/or middleware configured to implement the management of any one, any combination, or all of the stages of the model trainer 154. As discussed above, model trainer 154 is configured to train a model in order to identify the target views in an image stream. Model trainer 154 may be a representation of software, hardware, firmware, and/or middleware configured to implement respective features of the AutoVision management application 150.

The system 100 may further include a database 160 for storing data for use by the AutoVision management application 150. For example, images used by model trainer 154 may be stored in database 160.

The application server 140 may communicate with the database 160 directly to access the data. Alternatively, the application server 140 may also communicate with the database 160 via network 130 (e.g., the Internet). Though FIG. 1 illustrates direct and indirect communication, in one implementation, only direct communication is used, in an alternate implementation, only indirect communication is used, and still in an alternate implementation, both direct and indirect communication is used.

The application server 140 may communicate with any number and type of communication devices via network 130. For example, application server 140 may communicate with electronic devices associated with one or more users. For example, FIG. 1 depicts two mobile devices, including mobile device #1 (110) and mobile device #2 (140). The depiction in FIG. 1 is merely for illustration purposes. Fewer or greater numbers of mobile devices are contemplated.

Mobile device #1 (110) and mobile device #2 (140) shown in FIG. 1 may include well known computing systems, environments, and/or configurations that may be suitable for implementing features of the AutoVision application 115 such as, but are not limited to, smart phones, tablet computers, personal computers (PCs), server computers, handheld or laptop devices, multiprocessor systems, microprocessor-based systems, network PCs, or devices, and the like. FIG. 1 further shows that mobile device #1 (110) and mobile device #2 (140) include a processor 111, a memory 114 configured to store the instructions for operating AutoVision application 115 (the functionality being discussed further below), input/output device(s) 113 (such as touch sensitive displays, keyboards, or the like), and a communication interface 112.

Mobile device #1 (110) and mobile device #2 (140) may also include one or more cameras 116, an accelerometer 117, a gyroscope 118, compass 119, or other positional, directional, orientational, angular, or accelerational sensors. As discussed further below, one or more of these sensors may be used to select a frame for one or more of the views of the vehicle.

The memory, as part of the AutoVision application 115 or separately, may store one or more indicators for predetermined views of the vehicle. As discussed further below, predetermined views of the vehicle may comprise exterior predetermined view(s) (e.g., a driver side view, a rear view, a passenger side view, a front view, etc.) and/or interior predetermined view(s) (e.g., a console view, a navigational system view, etc.). Each respective view may include one or more indicators indicative of the respective view. The one or more indicators may be generated in one of several ways. In one way, the one or more indicators may be part of the machine learning model, which is configured to learn aspects of the different views. In this regard, the predetermined views may comprise a set of predetermined views (e.g., a set of exterior predetermined view(s) and/or a set of interior predetermined view(s)).

One type of machine learning model is a neural network. In practice, the neural network may receive the pixel information from the image and associated the label (e.g., the specific predetermined view of the vehicle). The neural network may learn the shapes of things in the image. Further, given enough examples, the neural network may be trained to recognize (or label) similar shapes that it learned about (e.g., to label an image with a specific predetermined view of the vehicle).

The app may include one or more sets of predetermined views. Further, in one implementation, the app may select the one or more sets of predetermined views based input. As one example, a Vehicle Identification Number (VIN) may be input (such as by typing in the VIN or by taking a picture of the VIN and decoding the VIN in the picture, as disclosed in US Published Application No. 2016/0034590, incorporated by reference herein in its entirety). Based on the VIN input, the app may select a set of predetermined views, such as a predetermined set of views directly correlated to the VIN or a predetermined views partially correlated to the VIN (e.g., the VIN indicates a type of vehicle, such as an SUV, with the set of predetermined views correlated to the type of vehicle).

The various electronic devices depicted in FIG. 1 may be used in order to implement the functionality discussed herein. In this regard, each of mobile device #1 (110), mobile device #2 (140), application server 140, and database 160 may include one or more components of computer system 200 illustrated in FIG. 2.

Figure 2:
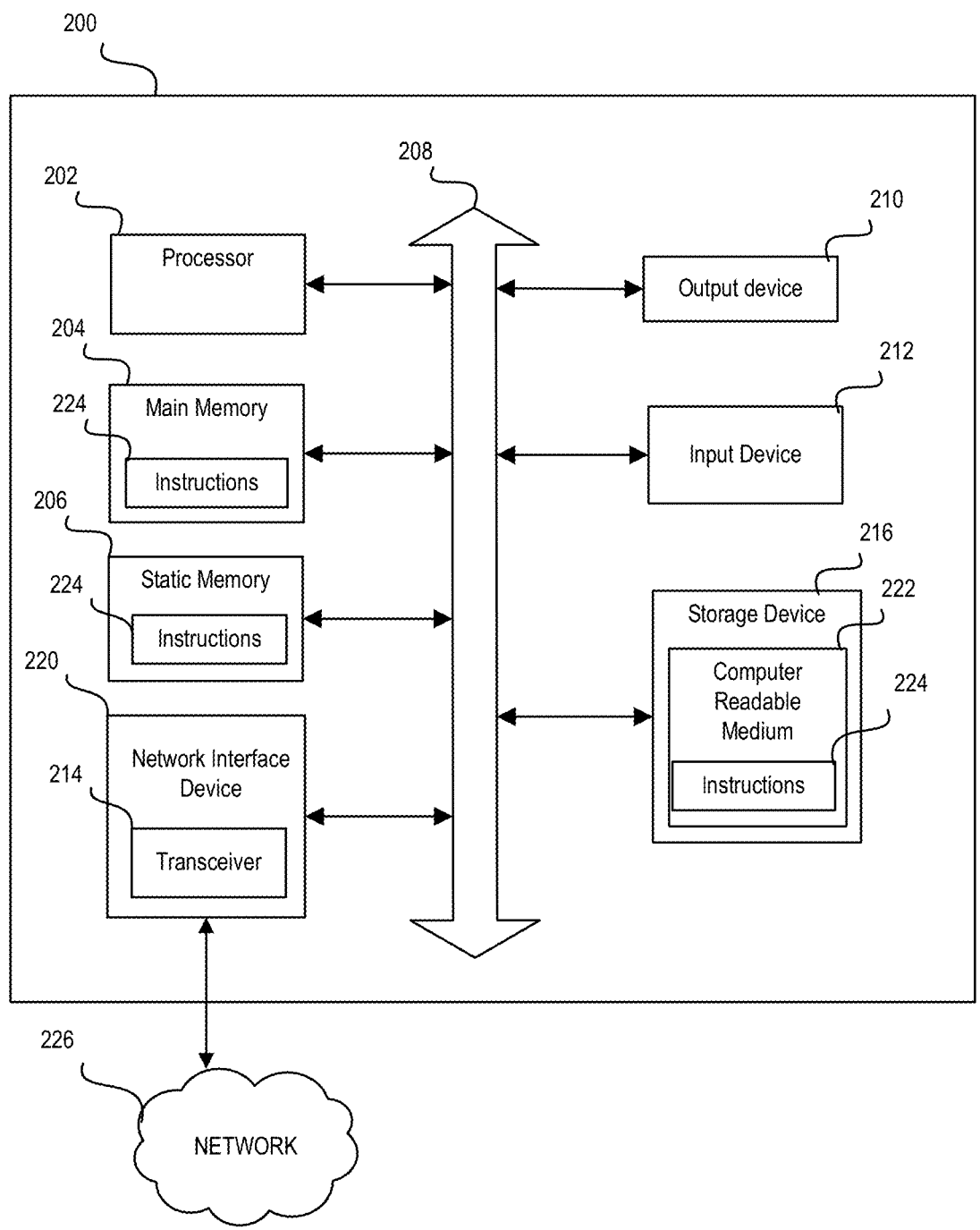
FIG. 2 illustrates a block diagram of exemplary computer architecture for a device in the exemplary system of FIG. 1.

FIG. 2 illustrates exemplary computer architecture for computer system 200. Computer system 200 includes a network interface 220 that allows communication with other computers via a network 226, where network 226 may be represented by network 130 in FIG. 1. Network 226 may be any suitable network and may support any appropriate protocol suitable for communication to computer system 200. In an implementation, network 226 may support wireless communications. In another implementation, network 226 may support hard-wired communications, such as a telephone line or cable. In another implementation, network 226 may support the Ethernet IEEE (Institute of Electrical and Electronics Engineers) 802.3x specification. In another implementation, network 226 may be the Internet and may support IP (Internet Protocol). In another implementation, network 226 may be a LAN or a WAN. In another implementation, network 226 may be a hotspot service provider network. In another implementation, network 226 may be an intranet. In another implementation, network 226 may be a GPRS (General Packet Radio Service) network. In another implementation, network 226 may be any appropriate cellular data network or cell-based radio network technology. In another implementation, network 226 may be an IEEE 802.11 wireless network. In still another implementation, network 226 may be any suitable network or combination of networks. Although one network 226 is shown in FIG. 2, network 226 may be representative of any number of networks (of the same or different types) that may be utilized.

The computer system 200 may also include a processor 202, a main memory 204, a static memory 206, an output device 210 (e.g., a display or speaker), an input device 212, and a storage device 216, communicating via a bus 208.

Processor 202 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. Processor 202 executes instructions 224 stored on one or more of the main memory 204, static memory 206, or storage device 215. Processor 202 may also include portions of the computer system 200 that control the operation of the entire computer system 200. Processor 202 may also represent a controller that organizes data and program storage in memory and transfers data and other information between the various parts of the computer system 200.

Processor 202 is configured to receive input data and/or user commands through input device 212. Input device 212 may be a keyboard, mouse or other pointing device, trackball, scroll, button, touchpad, touch screen, keypad, microphone, speech recognition device, video recognition device, accelerometer, gyroscope, global positioning system (GPS) transceiver, or any other appropriate mechanism for the user to input data to computer system 200 and control operation of computer system 200 and/or operation of the AutoVision application 115. Input device 212 as illustrated in FIG. 2 may be representative of any number and type of input devices.

Processor 202 may also communicate with other computer systems via network 226 to receive instructions 224, where processor 202 may control the storage of such instructions 224 into any one or more of the main memory 204 (e.g., random access memory (RAM)), static memory 206 (e.g., read only memory (ROM)), or the storage device 216. Processor 202 may then read and execute instructions 224 from any one or more of the main memory 204, static memory 206, or storage device 216. The instructions 224 may also be stored onto any one or more of the main memory 204, static memory 206, or storage device 216 through other sources. The instructions 224 may correspond to, for example, instructions that AutoVision management application 150 or AutoVision application 115 illustrated in FIG. 1.

Although computer system 200 is represented in FIG. 2 as a single processor 202 and a single bus 208, the disclosed implementations applies equally to computer systems that may have multiple processors and to computer systems that may have multiple busses with some or all performing different functions in different ways.

Storage device 216 represents one or more mechanisms for storing data. For example, storage device 216 may include a computer readable medium 222 such as read-only memory (ROM), RAM, non-volatile storage media, optical storage media, flash memory devices, and/or other machine-readable media. In other implementations, any appropriate type of storage device may be used. Although only one storage device 216 is shown, multiple storage devices and multiple types of storage devices may be present. Further, although computer system 200 is drawn to contain the storage device 216, it may be distributed across other computer systems that are in communication with computer system 200, such as a server in communication with computer system 200. For example, when computer system 200 is representative of communication device 110, storage device 216 may be distributed across to application server 140 when communication device 110 is in communication with application server 140 during operation of the AutoVision management application 150 and/or AutoVision application 115.

Storage device 216 may include a controller (not shown) and a computer readable medium 222 having instructions 224 capable of being executed by processor 202 to carry out functions of the AutoVision management application 150 and/or AutoVision application 115. In another implementation, some or all of the functions are carried out via hardware in lieu of a processor-based system. In one implementation, the controller included in storage device 216 is a web application browser, but in other implementations the controller may be a database system, a file system, an electronic mail system, a media manager, an image manager, or may include any other functions capable of accessing data items. Storage device 216 may also contain additional software and data (not shown), for implementing described features.

Output device 210 is configured to present information to the user. For example, output device 210 may be a display such as a liquid crystal display (LCD), a gas or plasma-based flat-panel display, or a traditional cathode-ray tube (CRT) display or other well-known type of display in the art of computer hardware. Accordingly, in some implementations output device 210 displays a user interface. In other implementations, output device 210 may be a speaker configured to output audible information to the user. In still other implementations, any combination of output devices may be represented by the output device 210.

Network interface 220 provides the computer system 200 with connectivity to the network 226 through any compatible communications protocol. Network interface 220 sends and/or receives data from the network 226 via a wireless or wired transceiver 214. Transceiver 214 may be a cellular frequency, radio frequency (RF), infrared (IR) or any of a number of known wireless or wired transmission systems capable of communicating with network 226 or other computer device having some or all of the features of computer system 200. Bus 208 may represent one or more busses, e.g., USB, PCI, ISA (Industry Standard Architecture), X-Bus, EISA (Extended Industry Standard Architecture), or any other appropriate bus and/or bridge (also called a bus controller). Network interface 220 as illustrated in FIG. 2 may be representative of a single network interface card configured to communicate with one or more different data sources.

Computer system 200 may be implemented using any suitable hardware and/or software, such as a personal computer or other electronic computing device. In addition, computer system 200 may also be a portable computer, laptop, tablet or notebook computer, PDA, pocket computer, appliance, telephone, server computer device, or mainframe computer.

Figure 3:
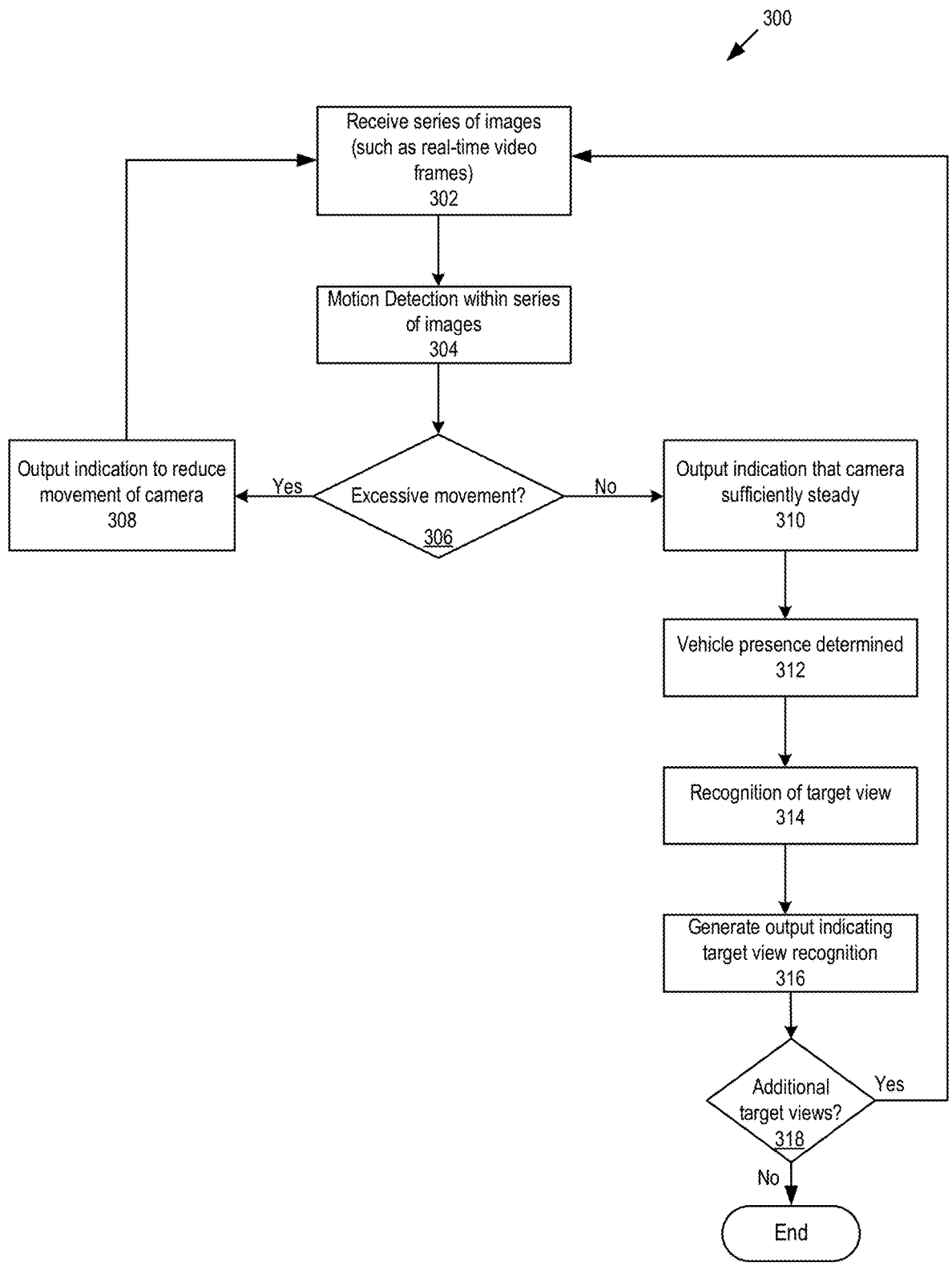
FIG. 3 illustrates an exemplary flow diagram of logic to obtain target views of the vehicle.

As discussed above, various target view of a vehicle may be obtained. FIG. 3 illustrates an exemplary flow diagram 300 of logic to obtain target views of the vehicle. At 302, the application receives a series of images, such as real-time video frames which may be generated by a camera resident on a smartphone or other mobile computing device. At 304, the application may detect motion within the series of images. At 306, it is determined whether there is excessive movement in the series of images. If so, at 308, the application outputs an indication to reduce movement of the camera. As one example, the display screen of the smartphone may indicate to reduce shaking of the camera. If there is no excessive movement, at 310, the application outputs an indication that the camera is sufficiently steady. As one example, the display screen of the smartphone may indicate "STEADY", as illustrated below. At 312, the application determines whether there is vehicle present in one or more of the images. As discussed above, the AutoVision Management Application 150 may send a model, such as a model generated by model trainer 154, to the AutoVision application 115. The model may be used by the AutoVision application 115 in order to identify the contours of a vehicle within an image. At 314, the application may recognize a target view. For example, the application may recognize that the vehicle identified in the image is in the position of "driver side" view. Responsive to recognizing the target view, at 316, the application may generate an output indicating view recognition. Further, at 318, it is determined whether there are additional target views to obtain. If so, flow diagram 300 loops back to 302. If not, flow diagram 300 proceeds to END.

Figure 4:
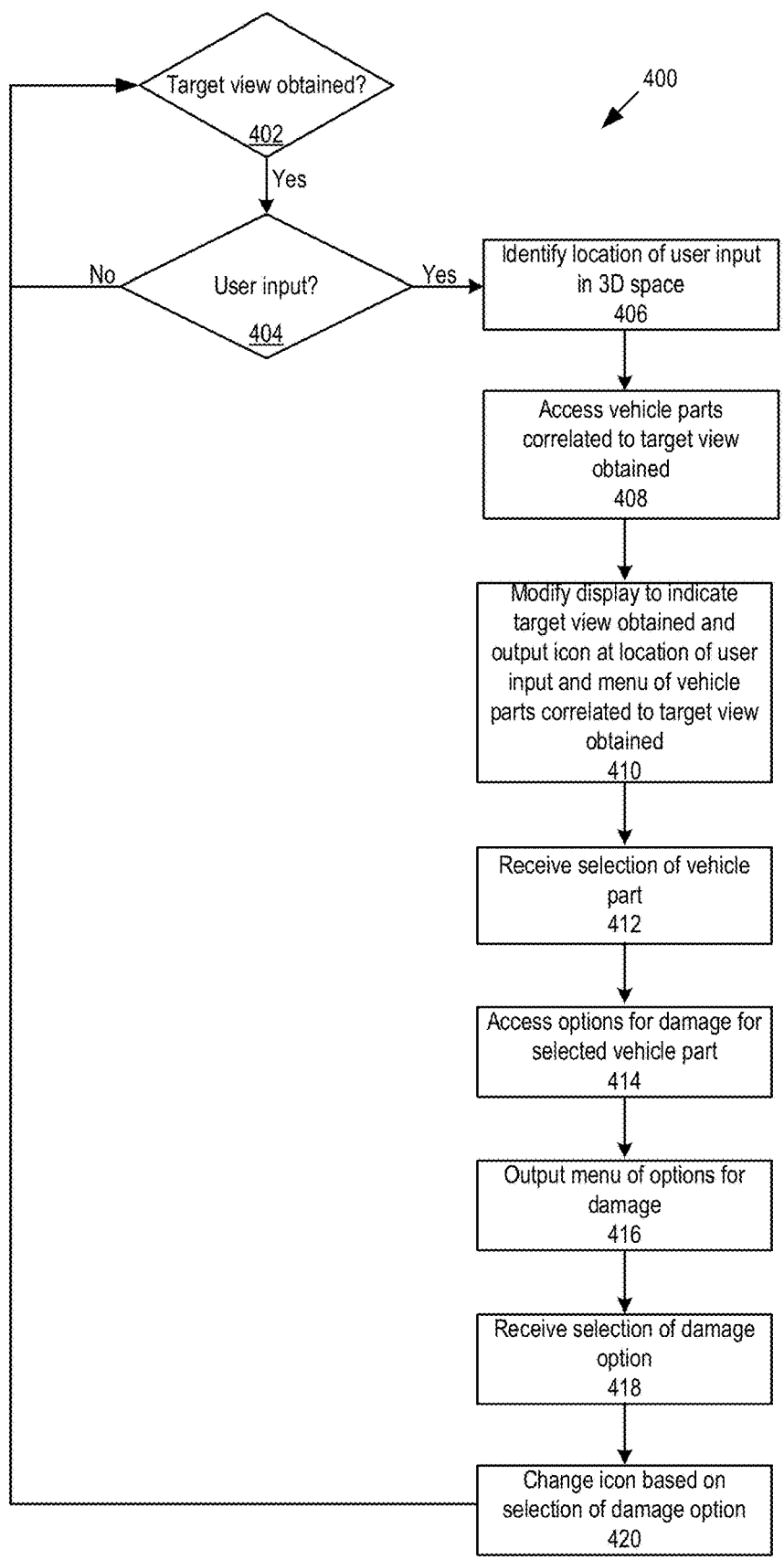
FIG. 4 illustrates an exemplary flow diagram of logic to input damage assessment of the vehicle.

FIG. 4 illustrates an exemplary flow diagram 400 of logic to input damage assessment of the vehicle. At 402, the application determines whether a target view has been obtained. If yes, at 404, the application determines whether the mobile device has received user input. If not, flow diagram 400 loops back to 402. If so, at 406, the application identifies the location of the user input in 3D space, as discussed above. At 408, the application accesses vehicle parts correlated to the target view obtained. For example, a driver side target view may have correlated the following body parts: window; body; door; roof; fender/quarter; wheel well; and bumper, as illustrated in FIG. 5D. At 410, the application modifies the display to indicate any one, any combination or all of: indicating that the target view has been obtained; outputting an icon (or other type of marker) at the location of the user input; and outputting a menu of the vehicle parts correlated to the target view obtained. At 412, the application receives a selection of the vehicle part. At 414, the application accesses the options for damage for the selected vehicle part. At 416, the application outputs the menu of options for damages for the selected vehicle part. At 418, the application receives a selection of the damage option. Finally, the application may change the icon (or other type of marker), which was output at 410, to another type based on the selection of the damage option. As discussed further below, the icon may be changed in one or more respects including any one, any combination or all of: color; shape; text to indication the selection of the damage option.

Figure 5A:
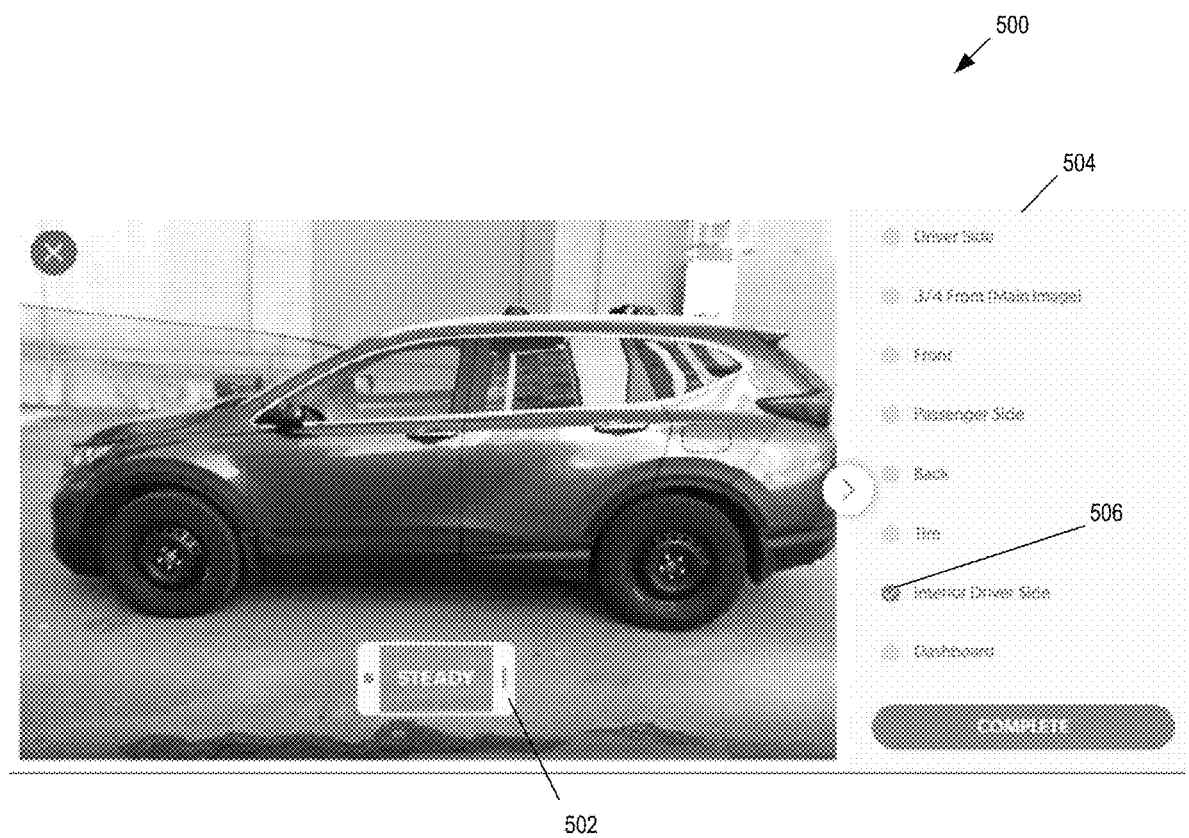
FIGS. 5A-J illustrates a series of screens in executing the vehicle application.
Figure 5B:
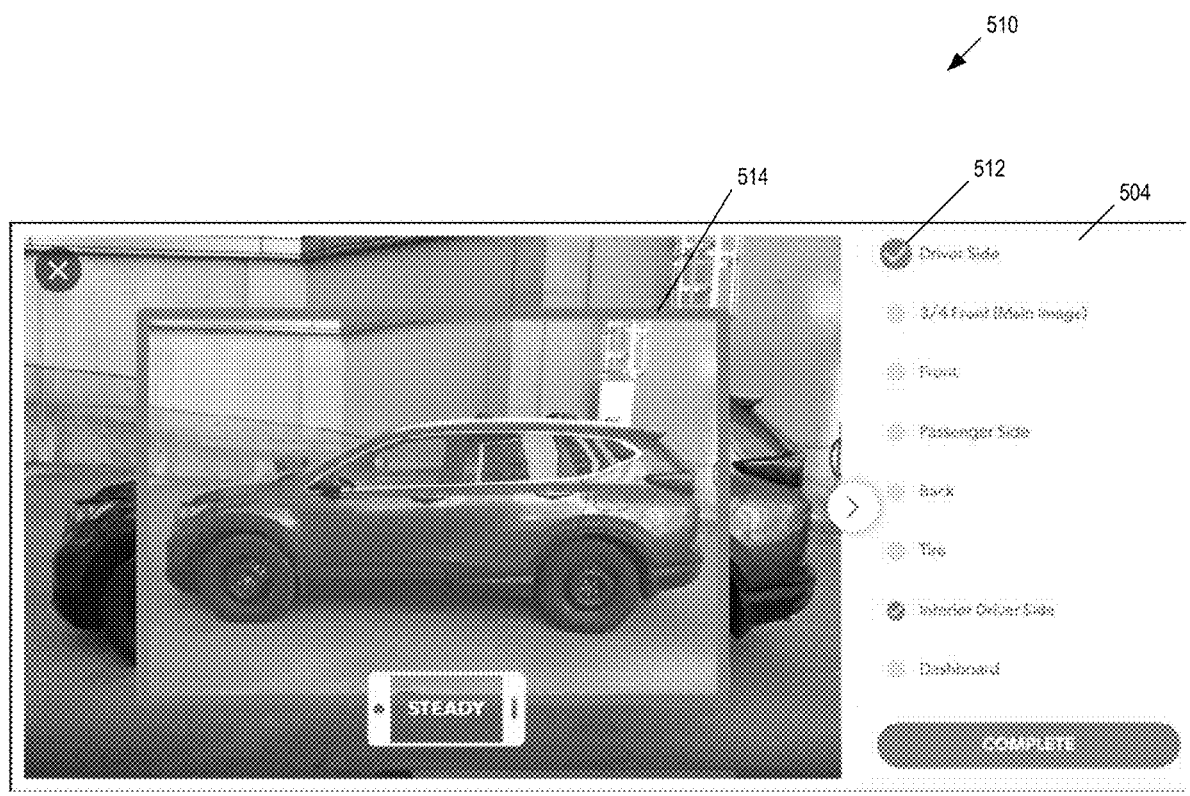
Figure 5C:
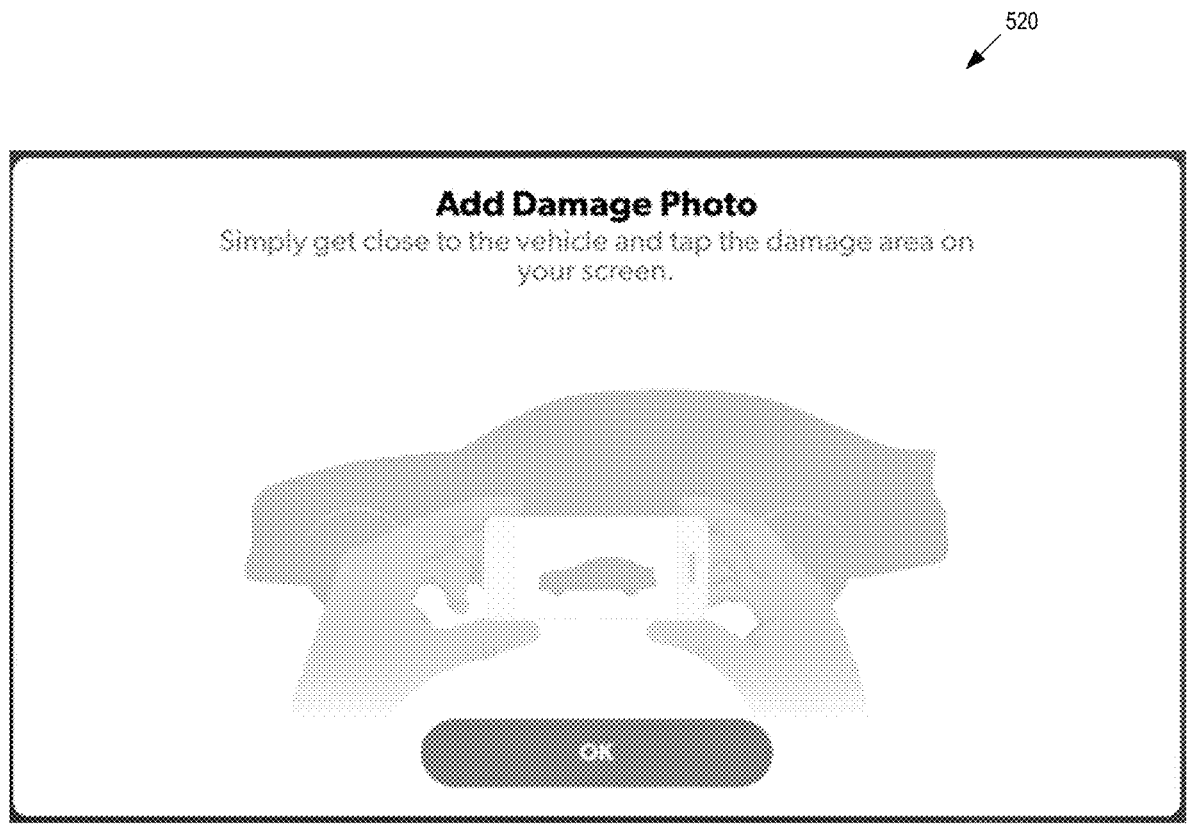
Figure 5D:
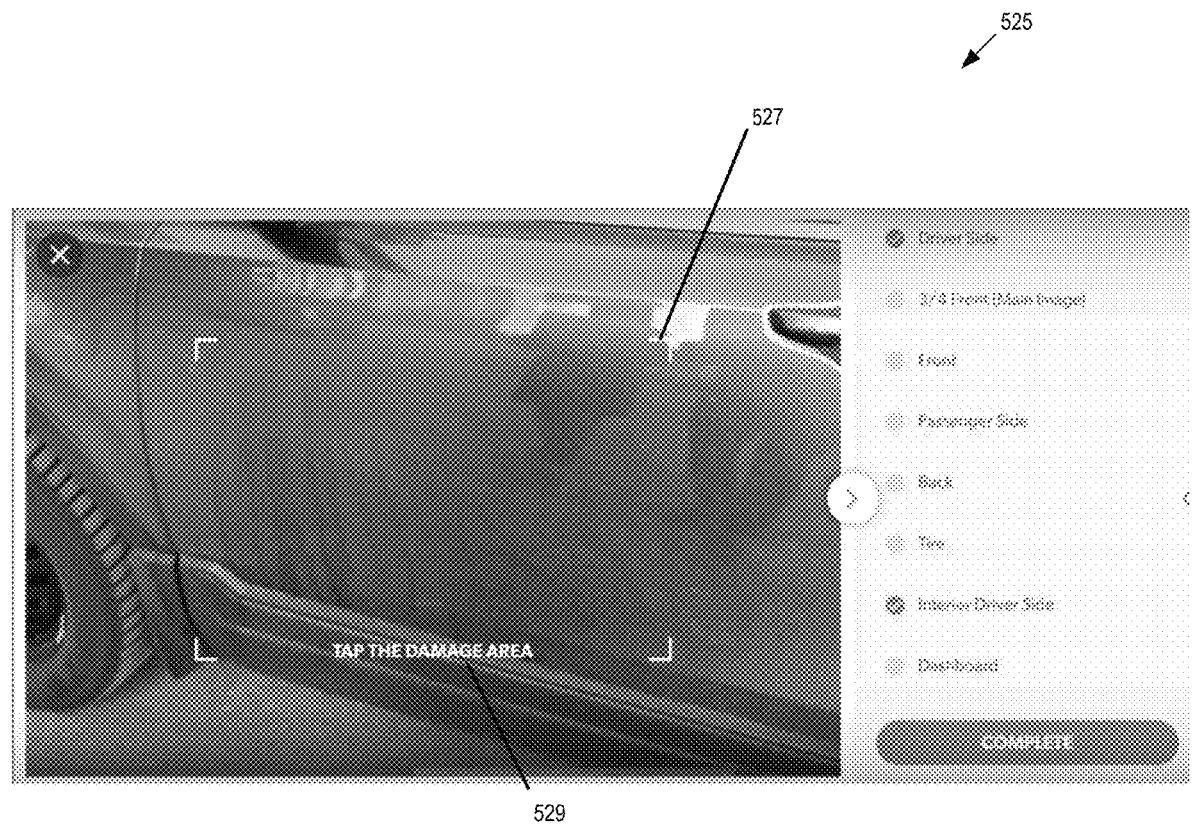

FIGS. 5A-J illustrate a series of screens in executing the vehicle application. In particular, FIG. 5A shows the display screen 500 illustrating an image in the video screen, illustrating "STEADY" 502 (indicating that the application has determined that the motion detection is not excessive) and illustrating a listing of target views 504. As shown in FIG. 5A, only the interior driver side target view has been obtained, as shown by the checkmark 506 next to the text.

FIG. 5B illustrates a screenshot 510 that the target view has been obtained. In particular, the application may output one or more visual cues in order to indicate to the user that the target view has been obtained. As one example, a checkmark 512 has been placed next to the driver side target view. As another example, the display is modified, such as by freezing the image 514 (e.g., temporarily showing the image of the target view on the display to the user) and/or by contracting and/or moving the frozen image to the right or left of the display.

FIG. 5C illustrates a screenshot 520 of another visual cue to indicate that the target view has been obtained. Specifically, FIG. 5C illustrates directions on the display to indicate damage to the vehicle (e.g., add a damage photo). In one manner, the user may move closer to the vehicle and tap the damage area on the screen.

FIG. 5D illustrates the screen after user has moved closer to the vehicle but before the user has tapped the screen. Specifically, the application outputs on the screen one or more guides 527 to frame the area whether the user is to tap to indicate damage. Further, the application may output instructions 529 to the user.

Figure 5E:
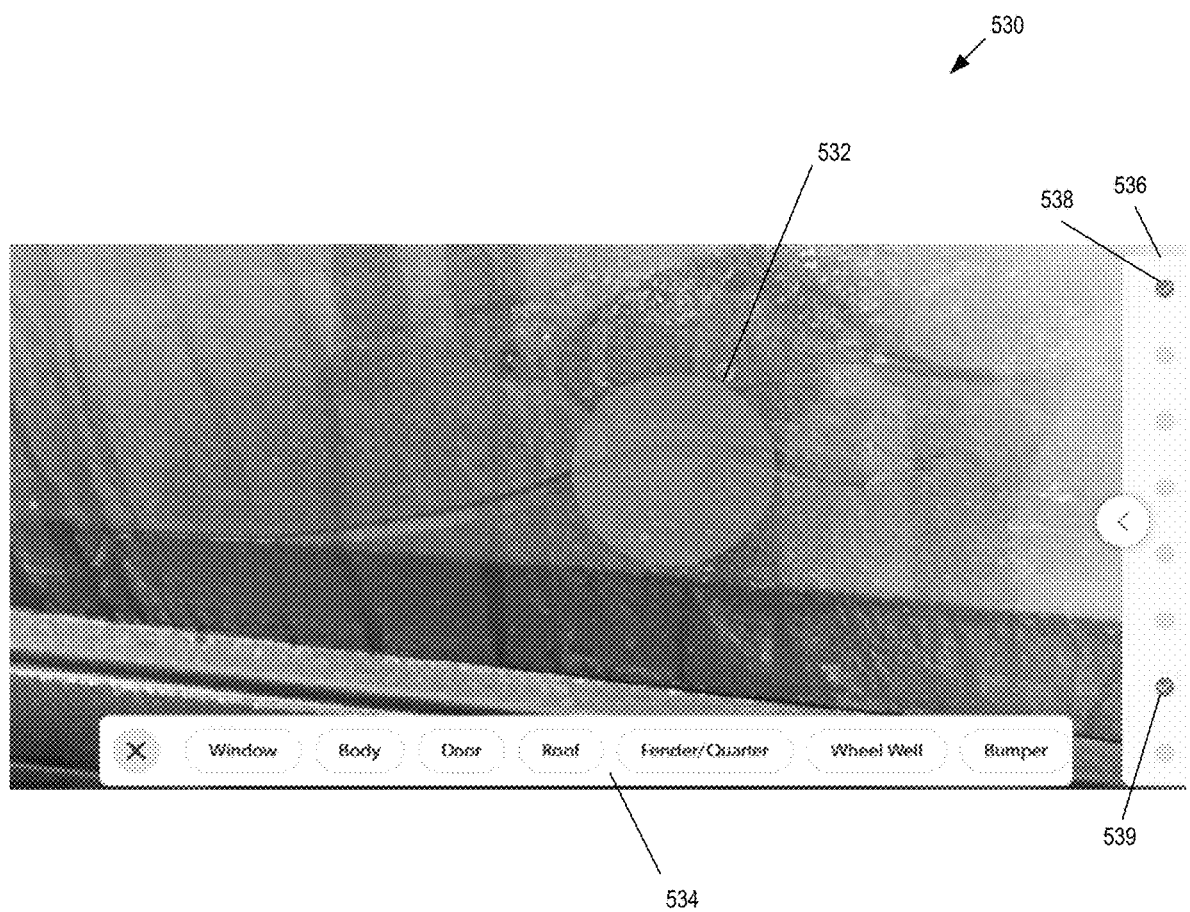

FIG. 5E illustrates the screen after the user has moved closer to the vehicle and tapped on the screen, which is one example of an indication of damage. Specifically, responsive to the tap, the application may output an icon, such as a dot 532, as illustrated in FIG. 5E. Further, responsive to the tap, the application may output a menu 534 (which may comprise a first level menu). As shown, for the driver side view, only the following vehicle body parts correlated to the driver side view are available in the menu 534: window; body; door; roof; fender/quarter; wheel well; and bumper. The user may input a selection from the menu 534, which is another example of an indication of damage. In addition, part or all of the listing 504 may be shown. For example, only a portion 536 of the listing 504 is shown, with the user tapping the screen allowing for the listing to be viewed similarly to FIG. 5A. The portion 536 includes checkmarks 538, 539 to indicate the images of views previously taken.

Figure 5F:
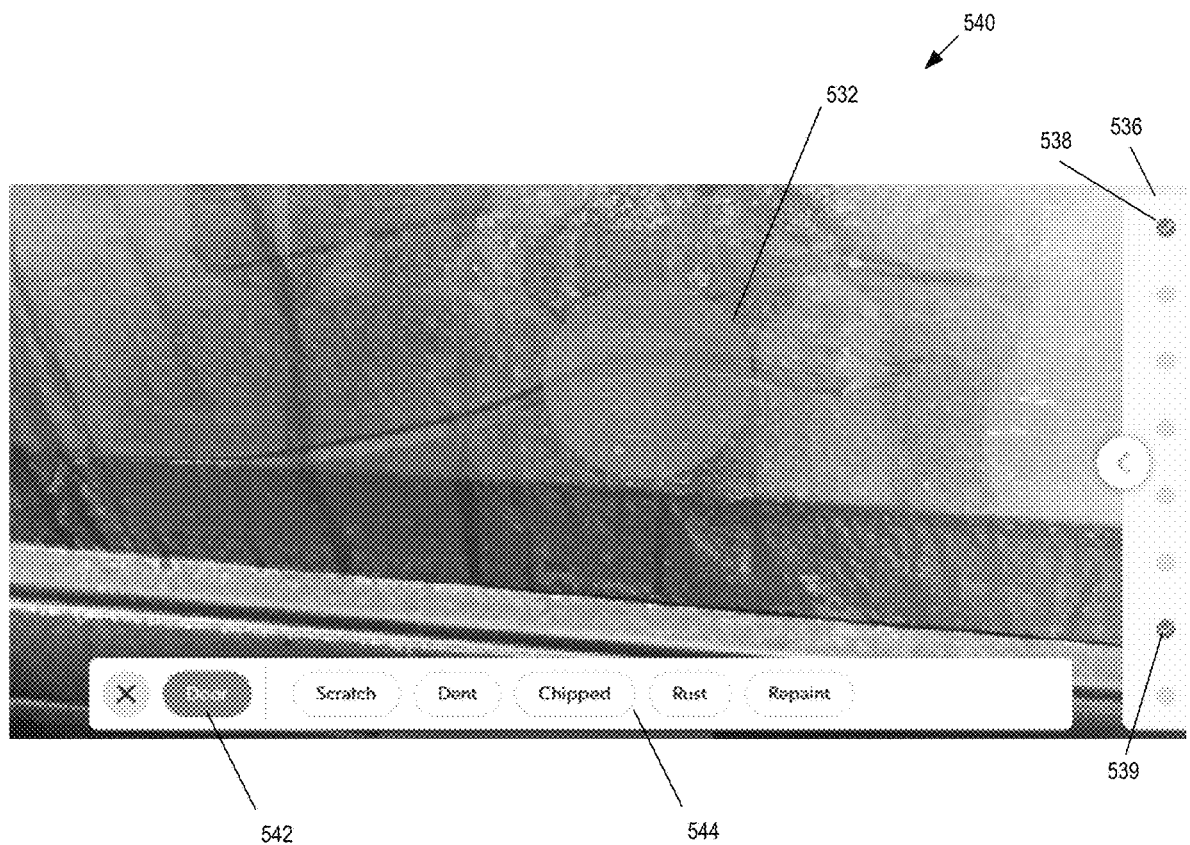

FIG. 5F illustrates the screen 540 after the user has input a selection of the body part. As shown, the user selected door 542 (which is highlighted to the left of the display). Further, options for types of damage is shown in menu 544 (limited to types of damage which can be associated with a door) are listed, including: scratch; dent; chipped; rust; and repaint (which may comprise a second level menu). The user may input a selection from the menu 544, which is yet another example of an indication of damage.

Figure 5G:
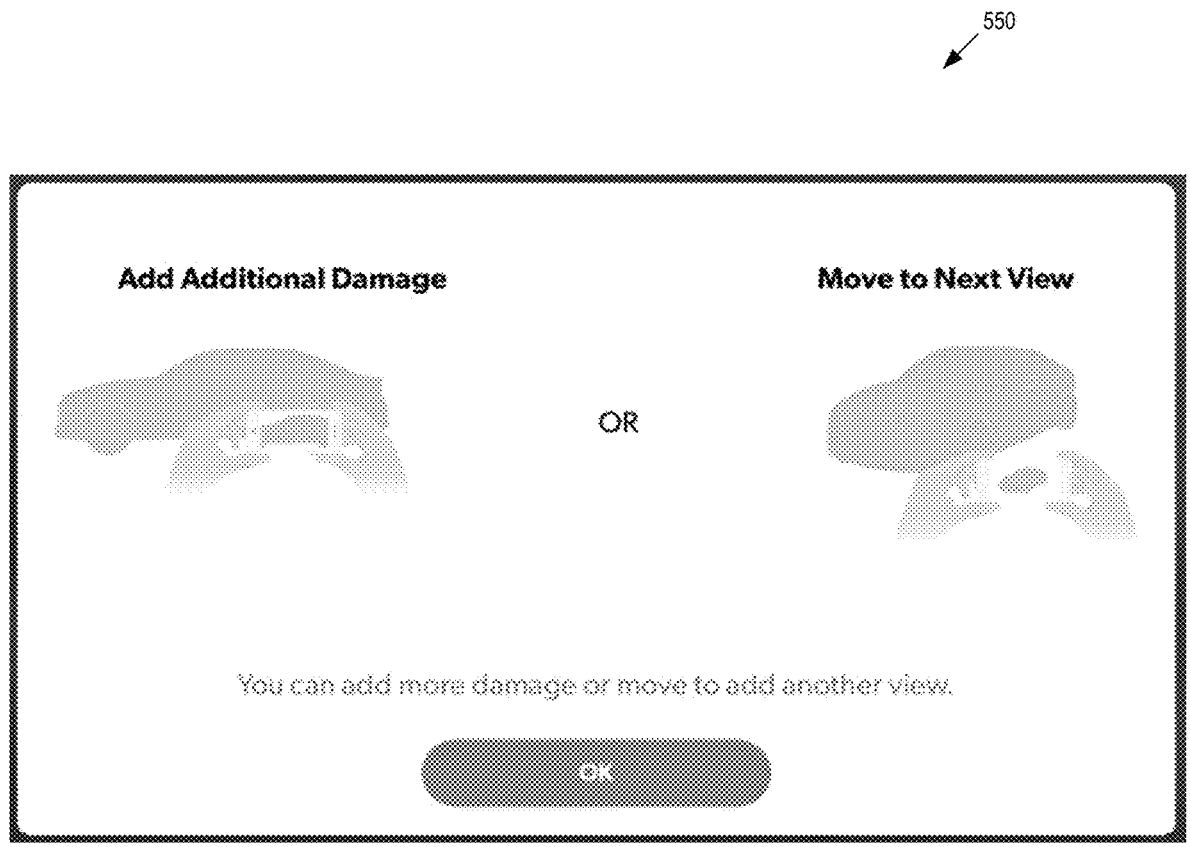

FIG. 5G illustrates the screen 550 after the user has input a selection as to the type of damage. As shown, the user may input additional damage information or may move to the next view (such as continue in a 360 degree movement around the exterior of the vehicle). Pressing "OK" removes the screen illustrated in FIG. 5G. In this regard, for a single predetermined view, such as the driver side view, the user may input damage information multiple times, such as at different parts of the driver side.

Figure 5H:
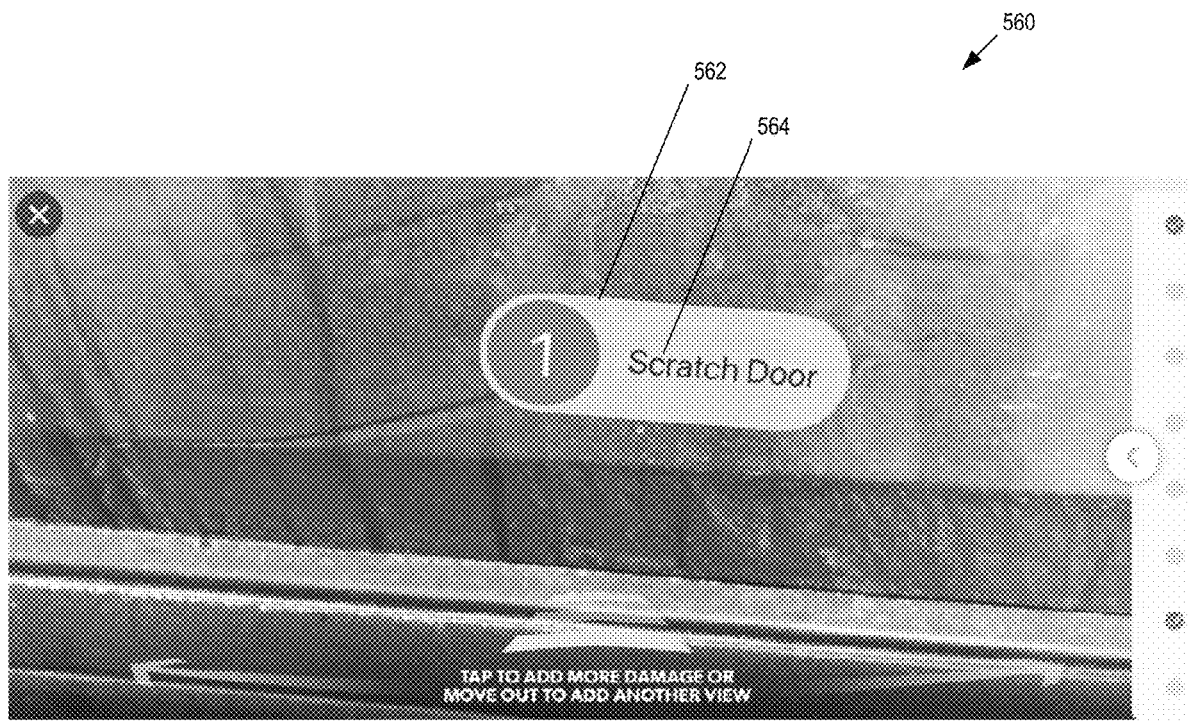

FIG. 5H illustrates a screen 560 of the change in the icon (or marker) from 532 to 562 after inputting the damage information. As shown, the icon 562 changes in shape and color. Further, data 564 may be added to the icon (or marker). As shown in FIG. 5H, the icon (or marker) includes "Scratch Door", indicating that the damage information is a scratch to the door. Further, the icon (or marker) includes a "1" indicating that this is the first damage indication input by the user for this vehicle.

Figure 5I:
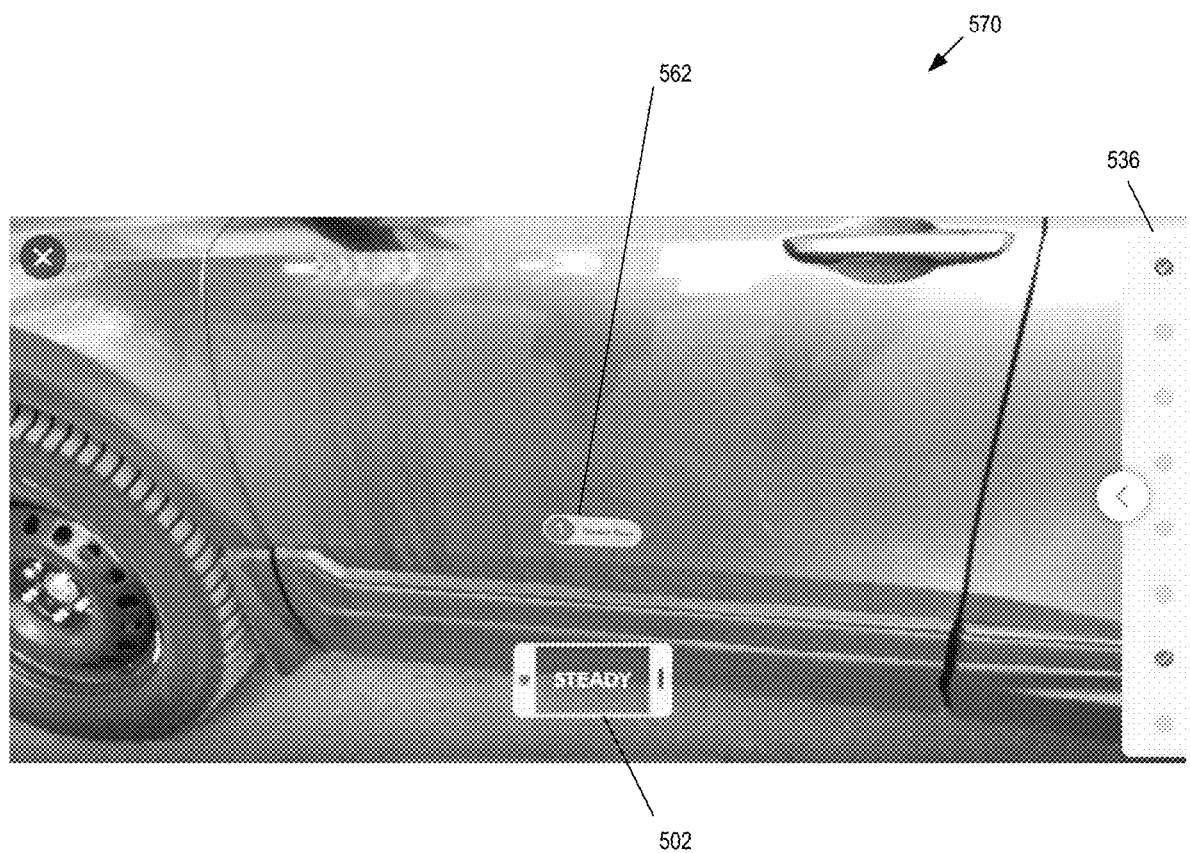

FIG. 5I illustrates that the augmented reality of the screen 570 is supplemented by the icon (or marker) being tracked in 3-dimensional space, with the image on the screen having the icon 562 superimposed on the section of the screen corresponding to the location of the tap. Thus, as the user steps back from the vehicle, the icon 562 (or marker) maintains its identified position in 3-dimensional space.

Figure 5J:
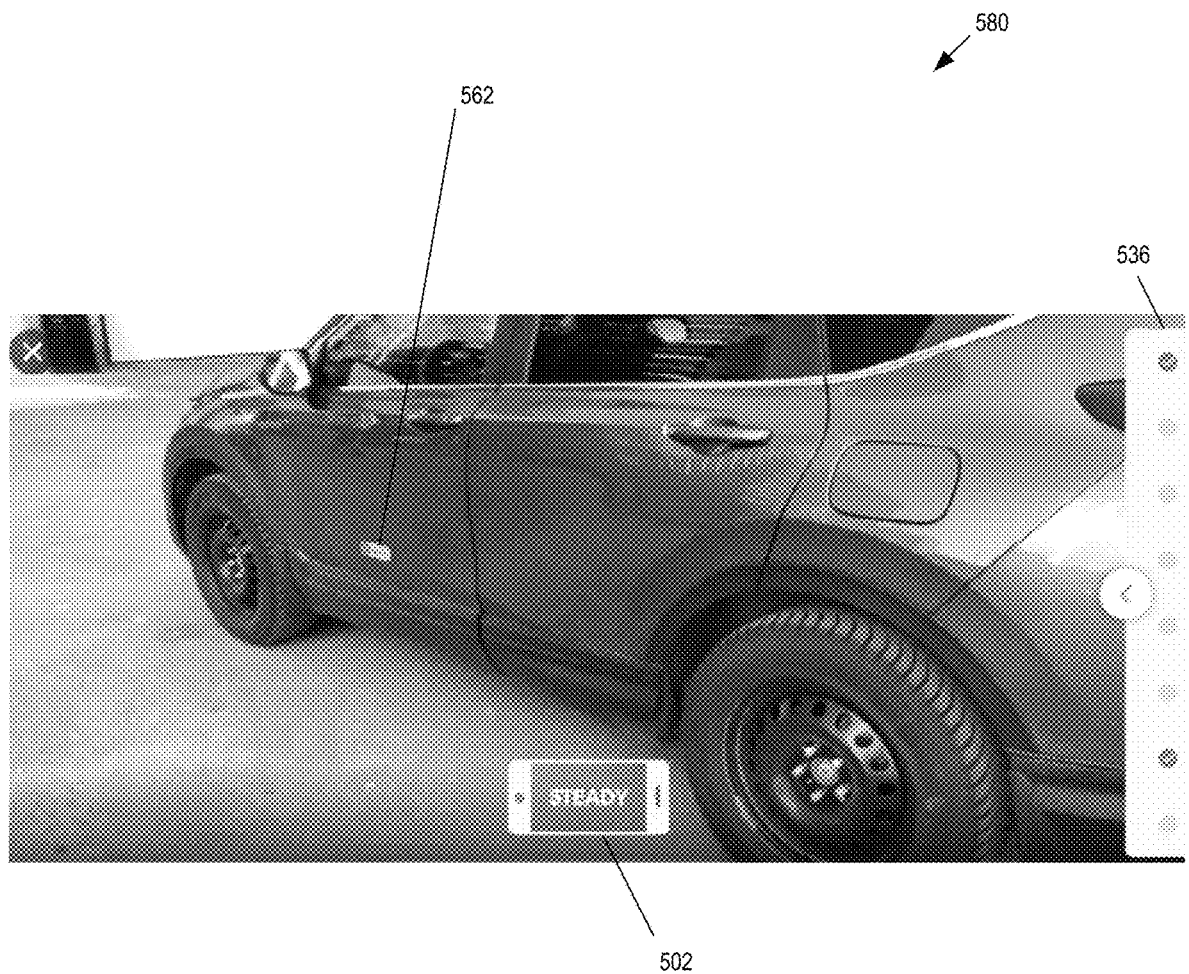

FIG. 5J further illustrates that the augmented reality of the screen is supplemented by the icon (or marker) being tracked in 3-dimensional space. As shown, even though the camera has moved around the vehicle (from that illustrated in FIG. 5I) the icon 562 (or marker) for the identified damage likewise tracks in 3-dimensional space to remain at the position as identified by the user.

After identification of damage for one, some, or all perspectives of the vehicle, the application may output the identified damage (e.g., generate a window on the display of the smartphone). As one example, after obtaining images for all perspectives of the vehicle (e.g., exterior views and interior views), the application may generate an output listing the identified damage for all perspectives of the vehicle (e.g., driver side door: scratch; rear bumper: rust; driver side seat: tear). As another example, responsive to identifying damage for a specific perspective of the vehicle, the application may output the listing of identified damage for the specific perspective (e.g., after obtaining the image of the specific perspective of the vehicle, output the listing of damage for the specific perspective prior to obtaining the image for the next perspective of the vehicle). Further, responsive to identifying the damage for all perspectives of the vehicle, the application may generate an estimate as to the cost to repair the identified damage. The estimate may be based, at least in part, on the machine learning model.

Figure 6A:
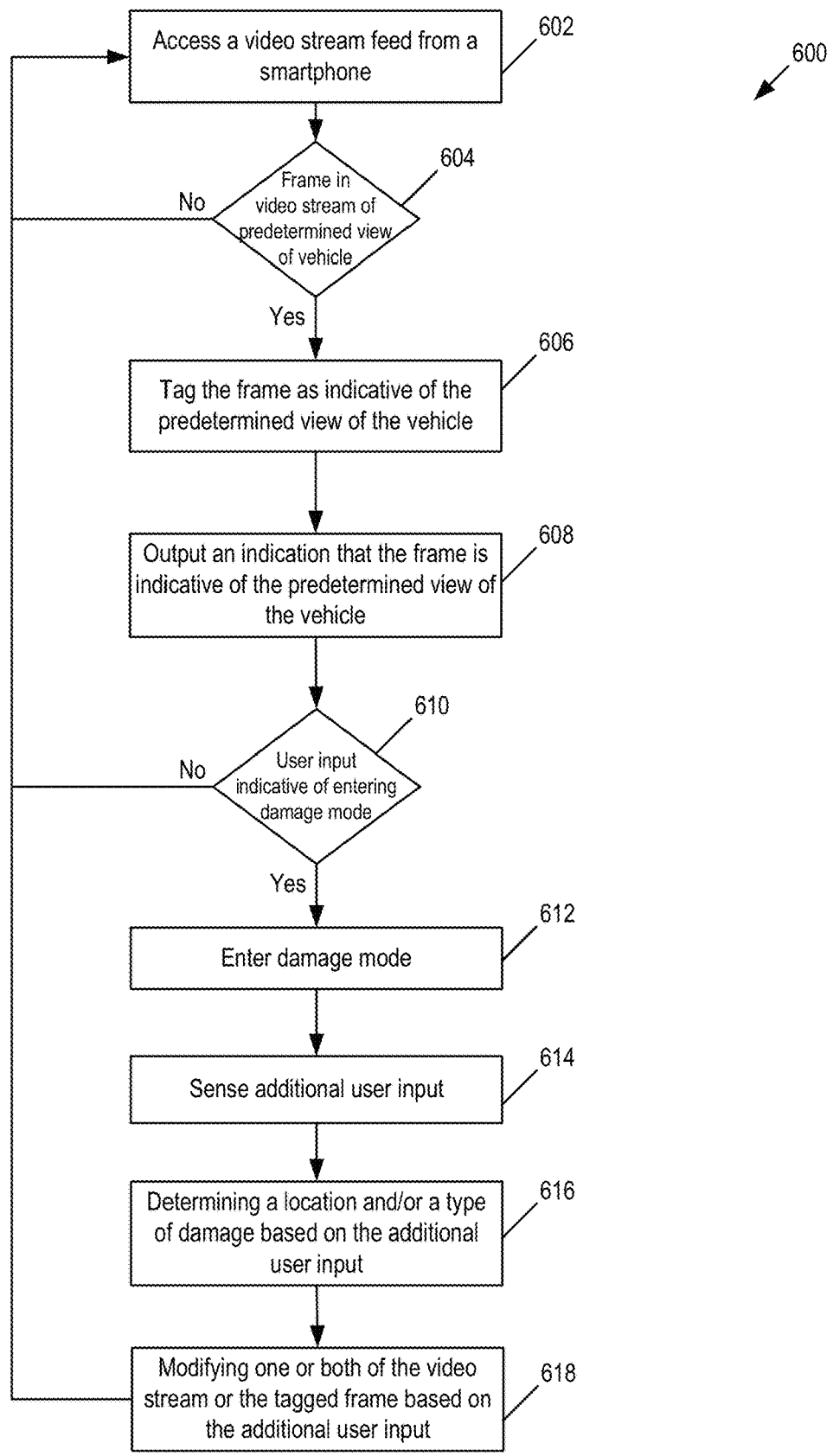
FIG. 6A illustrates an exemplary flow diagram to obtain predetermined view(s) of the vehicle, to input damage information, and to modify one or both of the video stream or obtained predetermined view(s) based on the input damage information.

FIG. 6A illustrates an exemplary flow diagram 600 to obtain predetermined view(s) of the vehicle, to input damage information, and to modify one or both of the video stream or obtained predetermined view(s) based on the input damage information. At 602, the mobile device, such as the application executed on the smartphone, access a video stream feed. At 604, the application determines whether a frame from the accessed video stream feed is of a predetermined view of the vehicle. For example, the application may determine whether the driver side view is within the frame. In response to determining that the frame is not of the predetermined view of the vehicle, flow diagram 600 loops back to 602. Responsive to determining that the frame is of the predetermined view of the vehicle, at 606, the application tags the frame as indicative of the predetermined view of the vehicle. Further, at 608, the application may output an indication that the frame is indicative of the predetermined view of the vehicle. As discussed above, various indications may be generated including any one, any combination, or all of: temporarily or momentarily (e.g., less than 1 second) freezing part or all of the image on the touchscreen; moving the image to the right or the left of the screen; or updating a listing with a checkmark to indicate that the image of the predetermined view was obtained.

At 610, the application determines whether the user has provided input indicative of entering damage mode. As discussed above, various inputs are contemplated including tapping the touchscreen and/or moving closer to the vehicle. Other types of inputs are contemplated. Responsive to determining that no user input indicating entering damage mode has been received, flow diagram 600 loops back to 602. Responsive to determining that user input indicating entering damage mode has been received, at 612, the application enters damage mode. Alternatively, the application may automatically enter damage input mode after identifying the image of the predetermined view and may await user input indicative of the placement/type of damage.

At 614, the application senses whether additional user input indicative of a placement/type of damage. As one example, the user may tap the screen indicative of a location of damage on the vehicle. Alternatively, or in addition, responsive to the application generating a menu of the location (e.g., see FIG. 5D listing a menu of window, body, door, roof, fender/quarter, wheel well, bumper or see FIG. 5E listing a menu of type of damage including scratch, dent, chipped, rust, repaint), the user may tap the touchscreen in order to provide the additional user input. At 616, responsive to the additional user input, the application may determine a location and/or a type of damage. At 618, the application may then modify one or both of the video stream or the tagged frame based on the additional user input.

Figure 6B:
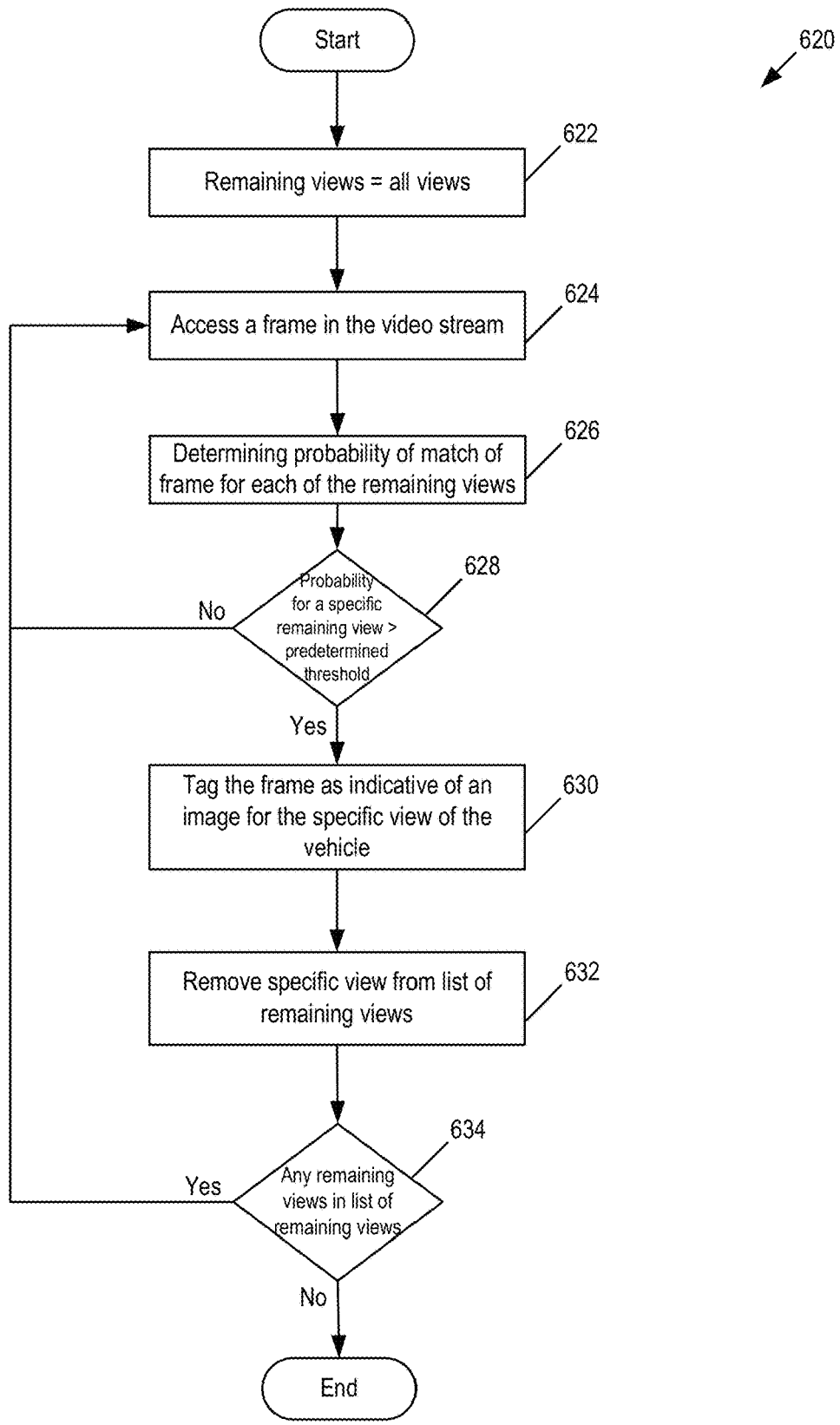
FIG. 6B illustrates an exemplary flow diagram to obtain multiple predetermined views of the vehicle from the video stream in any order.

FIG. 6B illustrates an exemplary flow diagram 620 to obtain multiple predetermined views of the vehicle from the video stream in any order. The analysis illustrated in flow diagram 620 may be performed in real time (as the user is walking around and/or inside the vehicle). Alternatively, the analysis illustrated in flow diagram 620 may be performed after completion of taking the video stream. In still an alternate implementation, the analysis may begin while the video stream is being input and completed after completion of taking the video stream.

At 622, at initialization, the remaining views is set to all views, indicating that images of all of predetermined views are to be obtained. As one example, the entire set of predetermined views may include: front view, driver side view, rear view, passenger side view, perspective view, and dashboard view. At 624, the application accesses a frame in the video stream. At 626, the application determines a probability of a match of the frame for each of the views in the remaining views (e.g., the probability of a match for each of the front view, driver side view, rear view, passenger side view, perspective view, and dashboard view). At 628, the application determines whether the probability associated with a specific view (e.g., driver side view) is greater than a predetermined threshold. If not, the flow diagram 620 loops back to 622. If so, at 630, the application tags the frame as indicative of an image for the specific view of the vehicle. At 632, having obtained the image for the specific view of the vehicle, the application removes the specific view from the list of remaining views. At 634, the application determines whether there are any views remaining in the list of remaining views. If so, the flow diagram 620 loops back to 622. If not, the flow diagram 620.

Thus, in different iterations through flow diagram 620, all of the views in the list of remaining views are available for the probabilistic analysis. For example, in the first iteration, all of views for front view, driver side view, rear view, passenger side view, perspective view, and dashboard view in the list of remaining views are potentially available for being assigned to the current frame. In the event that the user begins the application at the driver side and that the application in the first iteration determines that the frame is associated with the driver side view, the application removes the driver side view from the list of remaining views. The user, starting at the driver side, may move in one of multiple ways, such as clockwise (to the front view), counterclockwise (to the rear view), or in another manner (opening the driver side door to image the interior of the vehicle). In any of these instances, the application may analyze the probability of all of the views in the list of remaining views to determine which view has the highest probability. Taking the example at hand, after the first iteration, the application may analyze whether a subsequent frame is a view for each of the front view, the rear view, or the interior view. In this way, the user may move about the vehicle in any order while the application may assign the views to the frames accordingly.

Figure 6C:
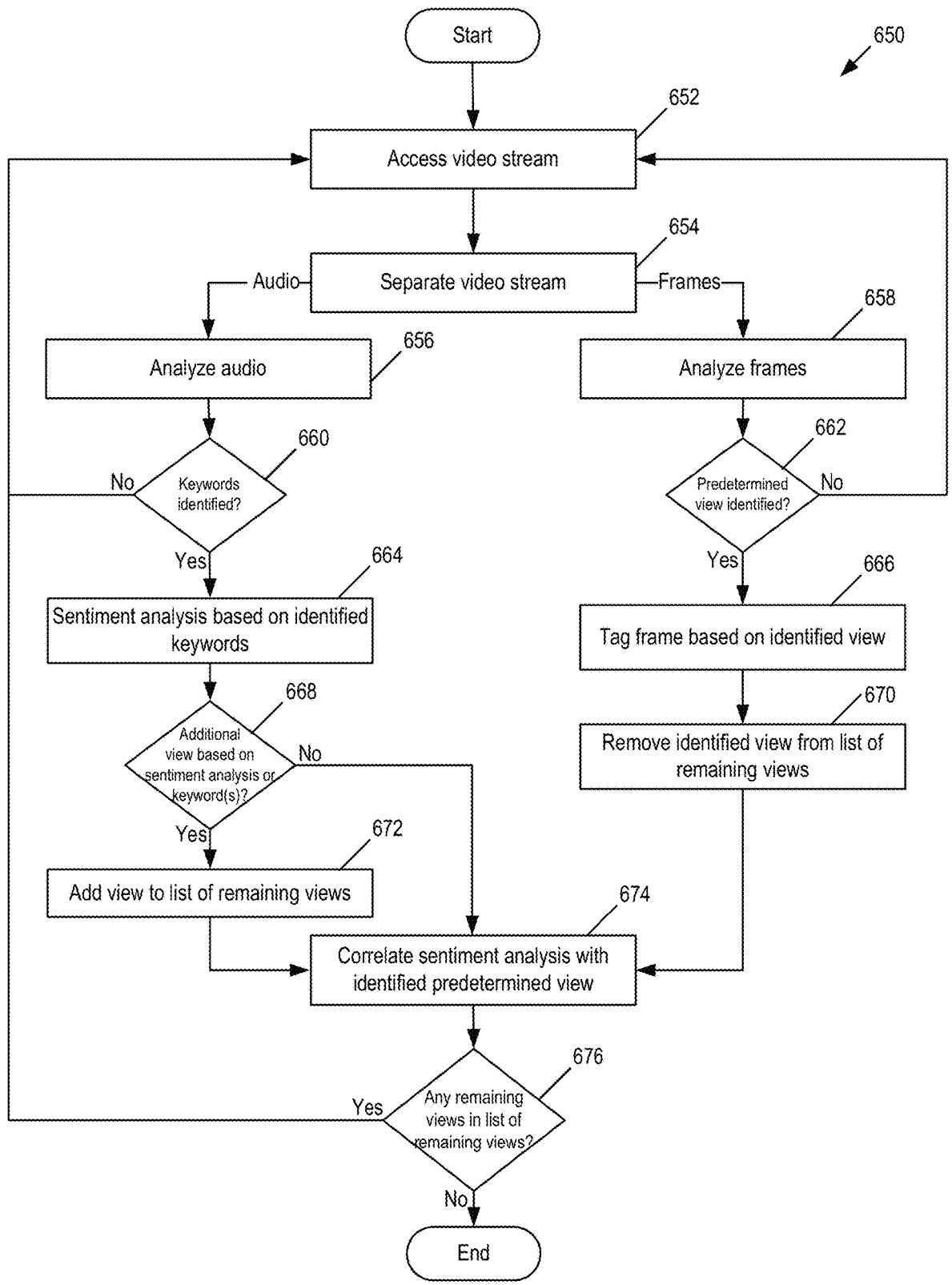
FIG. 6C illustrates an exemplary flow diagram to separate the video stream into audio and video frames, to analyze the audio to perform sentiment analysis and to obtain multiple predetermined views of the vehicle.

FIG. 6C illustrates an exemplary flow diagram 650 to separate the video stream into audio and video frames, to analyze the audio to perform sentiment analysis and to obtain multiple predetermined views of the vehicle. At 652, the video stream is accessed. At 654, the video stream is separate into audio and frames. At 656, the audio is analyzed. As discussed further below with regard to FIG. 10, an audio file, derived from the video stream, may be analyzed to identify one or more keywords. At 660, the application determines whether any keywords are identified. If not, flow diagram 650 loops back to 652. If so, at 664, the application may perform sentiment analysis based on the identified keyword(s).

In certain instances, the identified keywords and/or sentiment analysis may cause the application to obtain an additional view of the vehicle. As one example, the identified keyword(s) and/or the sentiment analysis may identify an option for the vehicle, such as a rear spoiler, oversized wheels, specialized rims, or the like. At 668, the application determines whether an additional view is to be obtained based on the sentiment analysis or the identified keyword(s). If so, at 672, the additional view is added to the list of remaining views. If now, the flow diagram 650 proceeds to 674.

At 658, the application analyze the frame(s). At 662, the application determines, based on the analysis, whether a predetermined view is identified. If not, the flow diagram 650 loops back to 652. If so, at 666, the frame is tagged with the identified view. Further, at 670, the identified view is removed from the list of views.

In one implementation, the sentiment analysis is correlated with the identified predetermined view. In this regard, at 674, the sentiment analysis is correlated with the identified predetermined view. Alternatively, or in addition, the sentiment analysis may generally be applied to all views (e.g., "mint condition"). At 676, the application determines whether there are any remaining views in the list of remaining views. If so, the flow diagram 650 loops back to 652. If not, the flow diagram 650 ends.

Figure 6D:
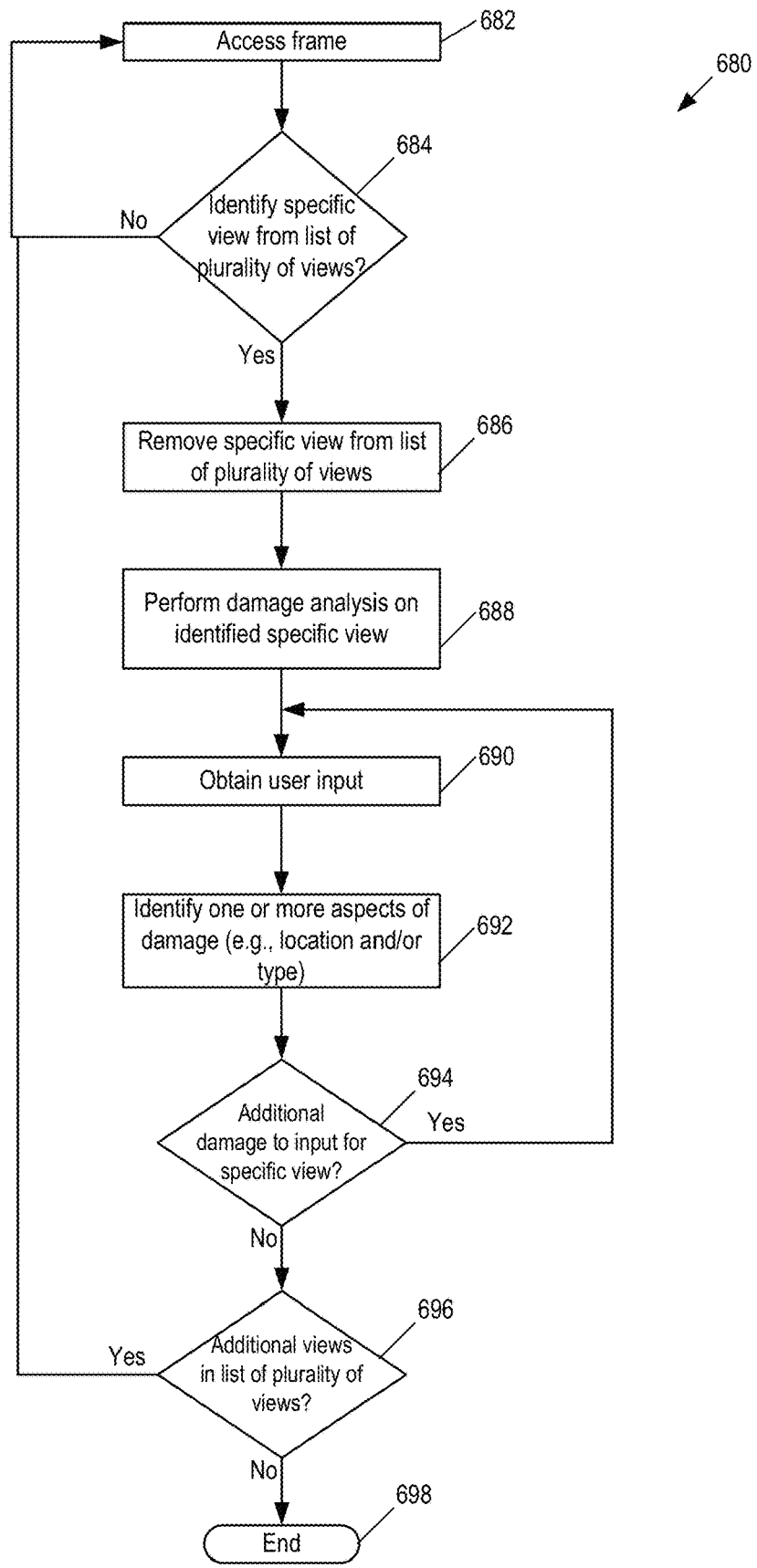
FIG. 6D illustrates an exemplary flow diagram to identify a specific view of the vehicle, and to identify one or more aspects of damage (e.g., location and/or type of damage) based on the identified specific view of the vehicle.

FIG. 6D illustrates an exemplary flow diagram 680 to identify a specific view of the vehicle, and to identify one or more aspects of damage (e.g., location and/or type of damage) based on the identified specific view of the vehicle. At 682, a frame is accessed. At 684, it is determined whether the accessed frame is identified as a specific view from a list of a plurality of views. As discussed above, a plurality of views, such as exterior views (e.g., front view, driver side view, back view, passenger side view, etc.) and interior views (e.g., dashboard view, odometer view, seat view, etc.) may sought to be obtained. Further, as discussed above, frames in the video stream may be accessed to determine whether to select the frame as an image for the respective view based on one or more criteria (e.g., any one, any combination or all of: centered in the frame, blurriness, or focused).

If the accessed frame is not identified for a specific view, flow diagram 680 loops back to 682. If so, at 686, the specific view identified is removed from the list of the plurality of views. At 688, damage analysis is performed at least in part based on the specific view identified. As discussed above, the machine learning model may be generated based on a perspective of the vehicle. In one example, the machine learning model may be correlated for a specific view (e.g., damage associated with the front view of the vehicle). In this regard, responsive to the application identifying a specific view at 684, the application may access the portion of the machine learning model correlated to the identified specific view. In another example, the machine learning model may be correlated for a set of views (e.g., damage associated with the exterior of the vehicle, damage associated with the interior of the vehicle). In this regard, responsive to the application identifying a specific view at 684, the application may determine the set of views (e.g., responsive to identifying a front view of the vehicle, the application may determine that the identified view is an exterior view), and access the portion of the machine learning model correlated to the identified specific view.

At 690, the application obtains user input. In one implementation, the user input comprises the application outputting the results of the automatic machine learning analysis of a damage location and/or a damage type (e.g., scratch on the driver side door) for the user to confirm. In another implementation, the application may output a narrowed set of choices of location and/or damage type in order for the user to select from the set of choices. For example, the automatic machine learning analysis may determine the location of the damage (e.g., the driver side door) and narrow down the types of damage to a scratch or a chip (removing the possibilities of a dent or rust). The location of the damage (the driver side door) and the type of damage (scratch or chip) are output to the user for the user to confirm that the damage is on the driver side door (or reject the location) and to select the type of damage offered (scratch or chip) or input a separate type of damage. Responsive to the user input, at 692, the application identifies one or more aspects of the damage (e.g., the location of the damage and/or the type of damage). At 694, it is determined whether there is additional damage to input for the specific view. For example, with regard to a specific view, there may be multiple points of damage (e.g., separate places for the driver side view where there is a scratch; a first place in the driver side view where there is a scratch and a second place in the driver side view where there is a dent). Responsive to determining that there is additional input to obtain from the user regarding damage for the specific view, flow diagram 680 loops back to 690. If not, flow diagram 680 goes to 696.

At 696, the application determines whether there are additional views, in the list of plurality of views, to obtain. If so, flow diagram 680 loops back to 682. Otherwise, at 698, flow diagram 680 goes to end.

Figure 7A:
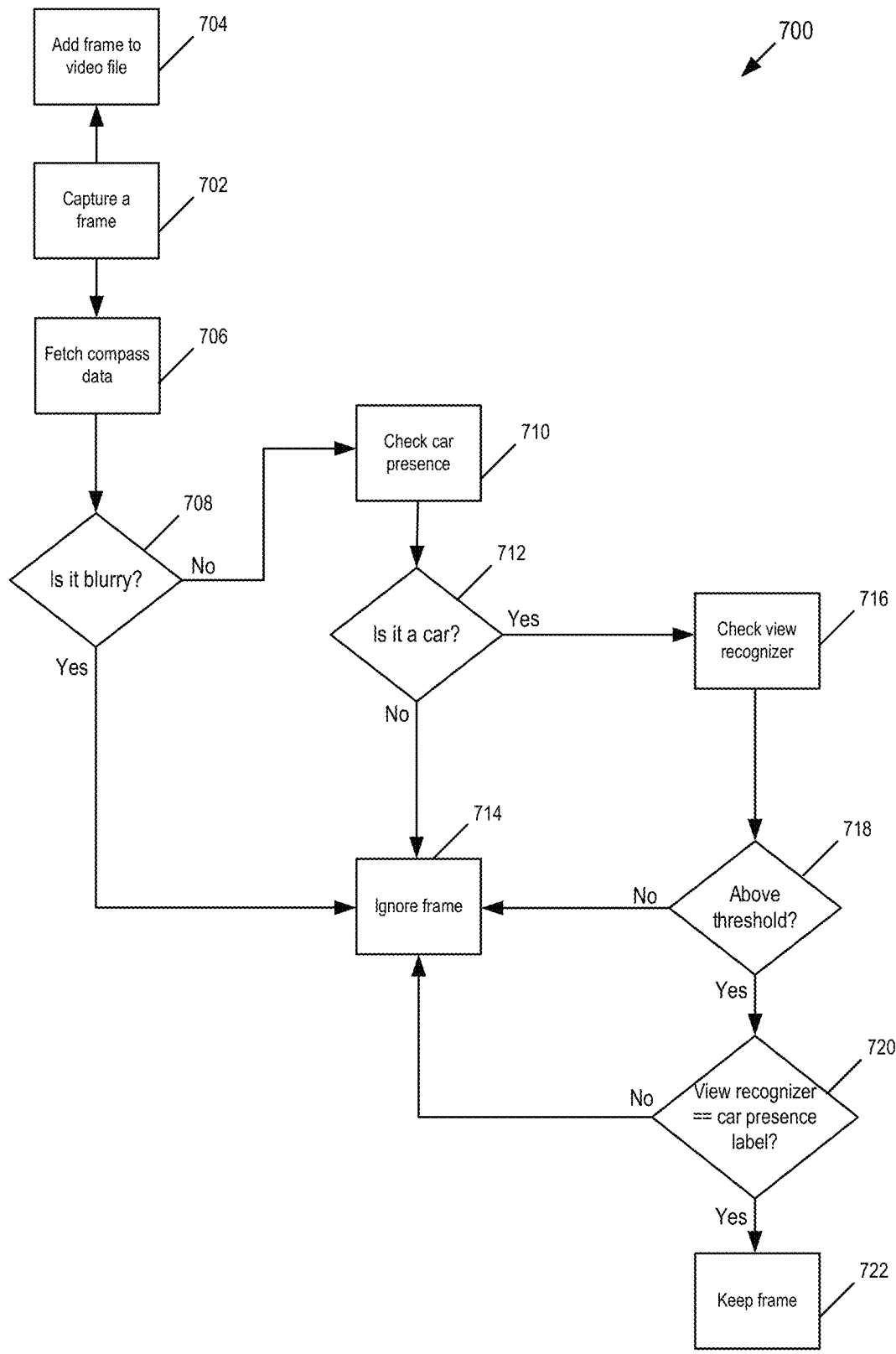
FIG. 7A illustrates an exemplary flow diagram to obtain a predetermined view of the vehicle.
Figure 8A:
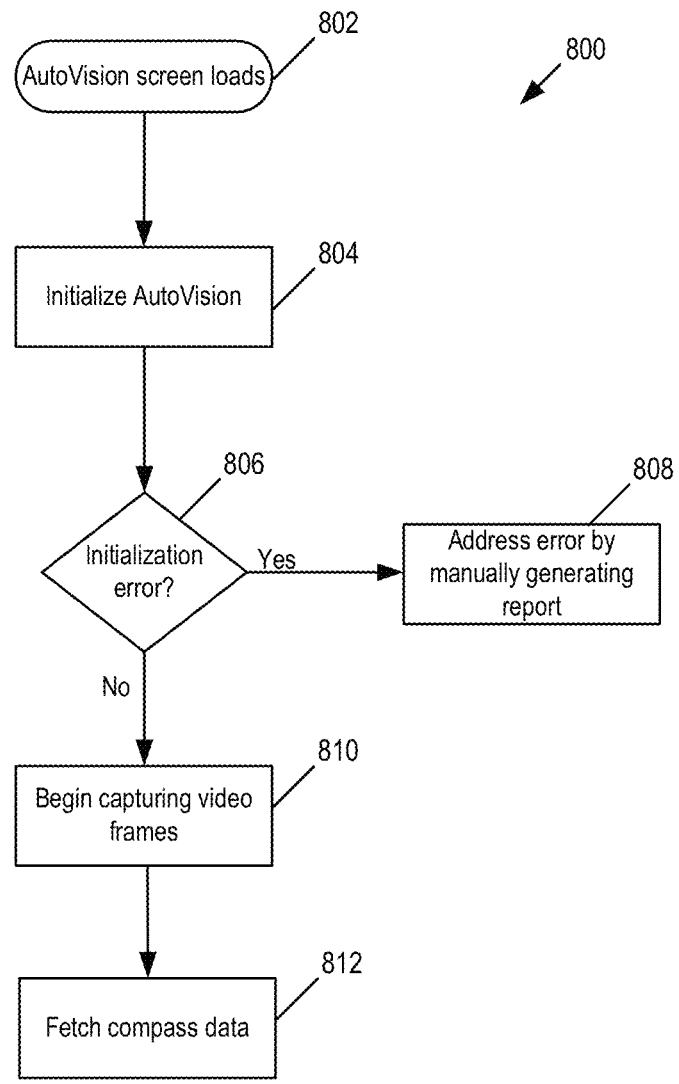
FIG. 8A illustrates an exemplary flow diagram to initialize the AutoVision application.

FIG. 7A illustrates an exemplary flow diagram 700 to obtain a predetermined view of the vehicle. At 702, a frame is captured. At 704, the frame is added to a video file. At 706, the application fetches compass data. Compass data may comprise navigational and/or orientational data that shows direction data relative to a geographic cardinal direction (e.g., N, S, E, W). Alternatively, the compass data may be fetched as part of the initialization, such as illustrated in FIG. 8A.

At 708, the application determines whether the frame is blurry. In one example, the measured blurriness may be compared with a minimum blurriness threshold. In one implementation, the minimum blurriness threshold is constant across all predetermined views. Alternatively, the application may check if the blurry metric is sufficient depending on the respective label (e.g., if the label is a console or a dashboard, the application seeks for the metric to be a little higher (e.g., more stringent) than the metric for the car exterior). In this way, images obtained for certain views, such as interior views, are held to a higher standard than other views, such as exterior views. In the event that the smartphone does not have the capability to sense blurriness, the flow diagram 700 may proceed to 710. If greater than the threshold ("Yes"), flow diagram 700 moves to 714 and ignores the frame. If less than the threshold ("No"), at 710, the application checks for a car is present in the frame. At 712, the application determines the car is present. If not, flow diagram 700 moves to 714 and ignores the frame.

If so, at 716, the application checks the view recognizer, which is configured to generate probabilities as to different views for the frame. At 718, the probabilities generated are determined whether above a threshold. If not, flow diagram 700 moves to 714 and ignores the frame. If so, at 720, the application checks whether the view recognizer==car presence label. This may be performed as a safeguard measure in which the application checks once more that the detailed label from the view recognizer belongs to the broad label from car presence. If not, flow diagram 700 moves to 714 and ignores the frame. If so, at 722, the application keeps the frame information (e.g., the time, compass data, blurry metric value, view recognizer label) for post processing. One example of post processing comprises damage analysis, such as analyzing the frame for damage indicative thereto. As discussed above, the specific view of the frame may be use in the damage analysis (e.g., whether the specific view is an exterior or an interior view). In this regard, the respective view obtained may be selected from multiple potential frames, with the selected view being the best image/frame of the respective view that is focused, not blurry, and centered in the image.

Figure 7B:
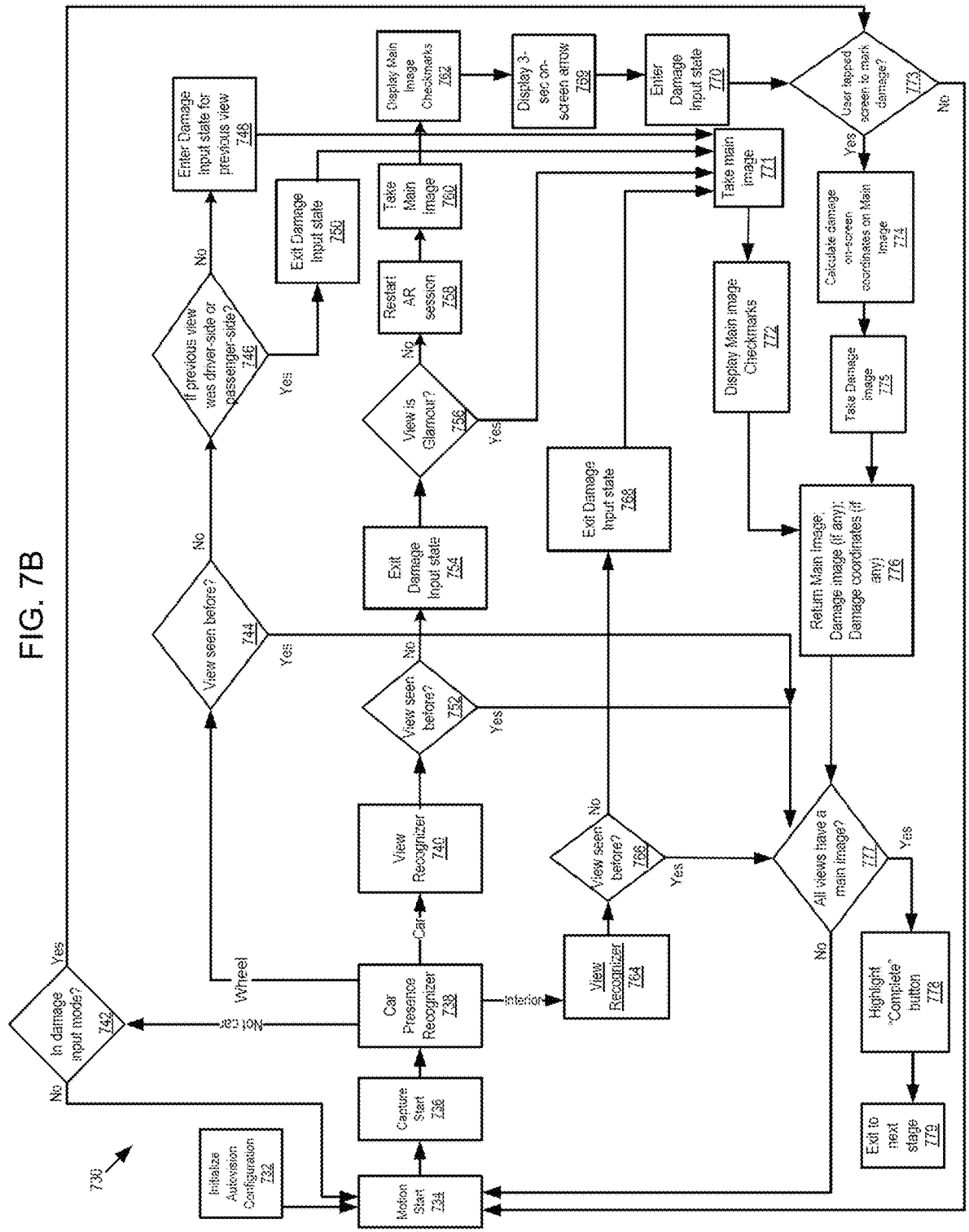
FIG. 7B illustrates an exemplary flow diagram for a workflow with augmented reality.

FIG. 7B illustrates an exemplary flow diagram 730 for a workflow with augmented reality. At 732, the AutoVision configuration is initialized. At 734, motion start is detected. At 736, capture start is detected. At 738, the car presence recognizer algorithm is used to detect whether a car is present. If no car is present, flow diagram 730 moves to 742 to determine whether the application is in input damage mode. If not, flow diagram 730 moves back to 734. If so, flow diagram 730 moves to 773 to determine whether the user tapped the screen to mark damage.

The car presence recognizer at 738 may recognize various parts of the car, such as the wheel, the overall car, or the interior. If the car presence recognizer recognizes the wheel, flow diagram 730 moves to 744 to determine whether the particular view was seen before. If so, flow diagram 730 moves to 777 to determine whether all views have a main image. If all of the views have a main image, at 778, the "complete" button on the screen is highlighted, indicating to the user that all of the predetermined views have been obtained. And, at 779, the application exits to the next stage.

If not, flow diagram moves back to 746, which determines whether the previous view was a driver side view or a passenger side view. If so, at 748, damage input mode is entered for the previous view. If not, at 750, the damage input state is exited. In this way, the exit from or entry into damage input state may be dependent on the previous view obtained and may indicate whether the user has moved closer to the vehicle in order to input damage. After which, at 771, the application may take the main image.

If the car presence recognizer recognizes the car, at 740, view recognizer is used to determine which, of the plurality of exterior views, is recognized. At 752, the application determines whether the particular view was seen before. If so, flow diagram 730 moves to 777 to determine whether all views have a main image. If not, at 754, the application exits the damage input state. At 756, the application determines whether the view is "glamour". In one implementation, a "glamour" view is a view that is not used to input damage, but to provide a desirable view to showcase the car. For example, a "glamour" view is a ¾ front perspective view of the vehicle, which is typically used as the main image of the vehicle. The software is configured to input damage for the front view and for the driver side view; in this regard, the "glamour" views are not be subject to damage input. Thus, if the view is "glamour", flow diagram 730 moves to 771 to take the main image, and at 772, to display checkmarks associated with the main images (e.g., predetermined views) that have been obtained). This is, for example, illustrated in FIG. 5D. If not, at 758, the augmented reality session is restarted, and at 760, the main image is taken.

Responsive to the main image being taken, at 762, the screen is modified to indicate this, such as by displaying a checkmark next to the main image taken. Further, at 769, the application displays an on-screen arrow for a certain period of time (e.g., 3 seconds) in order to indicate entry into damage mode. At 770, the application enters into the damage input state, thereby waiting to determine whether the user will input damage. At 773, the application determines whether the user has input damage, such as tapping the touchscreen to mark damage and/or providing audio input. If not, flow diagram 730 moves to 734.

If so, at 774, the application calculates the damage on-screen coordinates on the main image. For example, the application may determine where on the screen the tap occurred, and then correlate that information to the main image. In this way, the main image may be tagged in one of several ways based the damage information input. In one way, the tap may correlate to a point, in the main image, where the damage is indicated (and where an icon may be subsequently place). Alternatively, or in addition, the tap may be used to indicate the position of the damage with respect to the vehicle (e.g., in the driver side view, in the door on the driver side view, etc.). Further, at 775, the application may take a damage image (e.g., the application designates the frame when the user tapped the screen as the image of the damage area) and at 776, return the main image, the damage image (if one is available), and the damage coordinates (if available).

If the car presence recognizer recognizes an interior of the car, at 764, view recognizer is used to determine which, of the plurality of interior views, is recognized. At 766, the application determines whether the particular view was seen before. If so, flow diagram 730 moves to 777 to determine whether all views have a main image. If not, at 768, the application exits the damage input state.

In one implementation, once an acceptable frame is identified for an image of a specific view of the vehicle, subsequent frames in the video stream are not analyzed to determine whether they are acceptable for the specific view of the vehicle. In an alternative implementation, multiple frames may be identified as acceptable as images for the specific view of the vehicle. After compiling the multiple frames identified as acceptable as images for the specific view of the vehicle, the system may select a best frame from the multiple frames. In practice, the system may tag the multiple frames with one or more tags. In a first implementation, the system may tag each of the multiple frames with an indication as to the specific view of the vehicle (e.g., a tag identifying the frame as acceptable for the driver side view). Thereafter, the system may compile those frames as having the same tag (e.g., driver side view tag) and select from those frames compiled. In a second implementation, the system may tag each of the multiple frames with two or more tags. For example, frames may be tagged as any one, any combination, or all of: driver side view; the place of the frame in the video timeline (e.g., 9.321 seconds); and other sensor data (e.g., compass direction data indicative of direction of the smartphone when the frame was taken), as discussed further below.

Further, the system may determine whether a frame of the video stream is to be assigned as the image for a particular view based on one or more data inputs. In one implementation, the system may analyze a single data input to determine whether to assign a specific frame as the image for a particular view. For example, the system may examine the frames of a single video stream in order to determine whether to select the specific frame as the image for the particular view. Examples of this are shown in FIGS. 7A-B, discussed above.

Figure 7C:
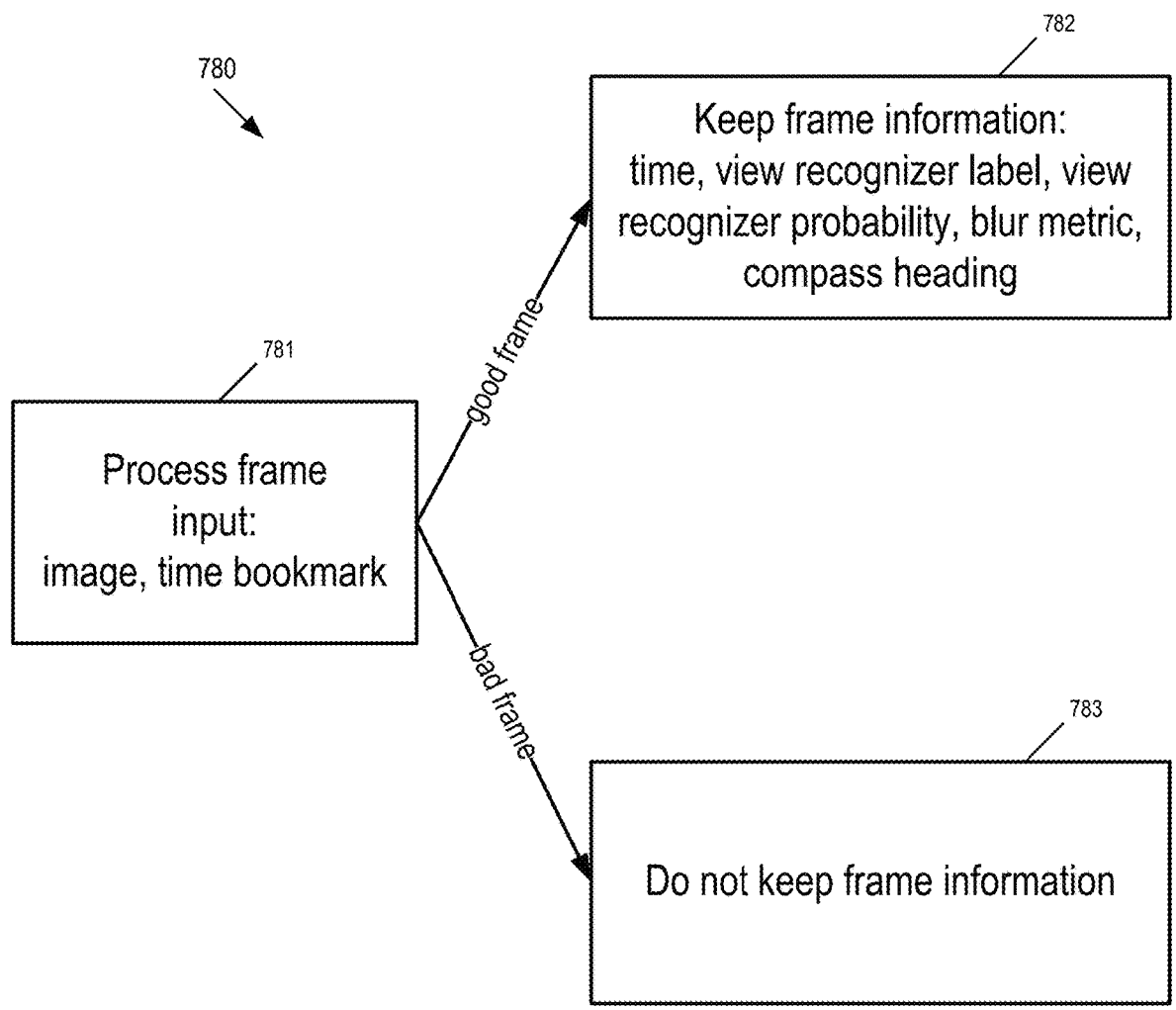
FIG. 7C illustrates one example of selection of good frames.
Figure 7D:
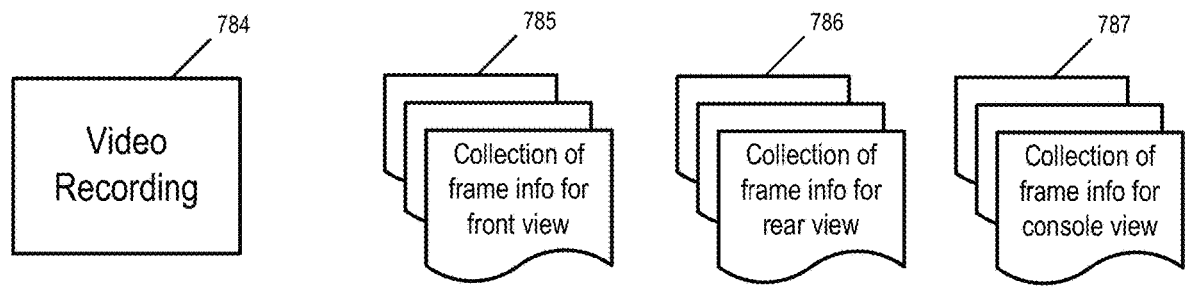
FIG. 7D illustrates collection of frame information for multiple view categories.
Figure 7E:
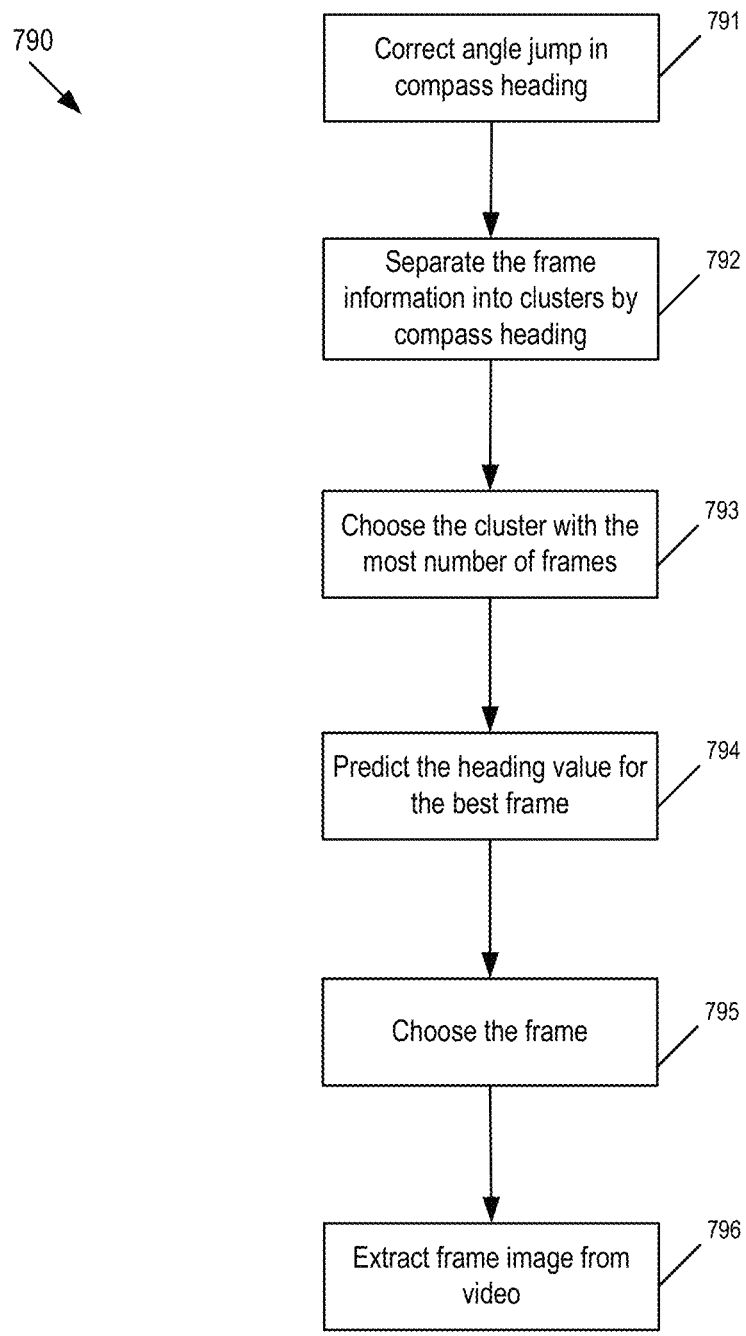
FIG. 7E illustrates one methodology to determine the "better" or "best" frame for one, some, or each of the predetermined views.

In an alternate implementation, the system may analyze data inputs from multiple sources in order to determine whether to select the specific frame as the image for the particular view. As one example, the system may analyze data from different types of data sources. In one specific implementation, the system may analyze data from an imaging data source (such as analyzing the frames in a video stream generated by a video camera) and analyze data from a non-imaging data source (e.g., a different type of data source than the camera, such as any one, any combination, or all of a positional, directional, orientational, angular, or accelerational data source). Examples of non-imaging data sources including, but are not limited to: a GPS receiver; a compass; an accelerometer; a gyroscope; a microphone (e.g., a microphone resident on the smartphone to generate sound data); etc. Examples of this are shown in FIGS. 7C-E. Other non-imaging data sources are contemplated. In another specific implementation, the system may analyze data from two separate imaging data sources, such as a first imaging data source generated by a first camera (e.g., with data generated in the visible spectrum) and a second imaging data source generated by a second camera (e.g., with data generated at least in a non-visible spectrum, such as in the infrared spectrum).

Thus, in one implementation, the images for all of the predetermined views may be selected by only one data input (e.g., examining the frames in the video stream). In an alternate implementation, the images for one or more predetermined views may be selected analyzing multiple inputs (e.g., the frames and another data input, such as compass data) whereas the images for a remainder of the predetermined views may be selected by only examining the frames. In still an alternate implementation, the images for all of the predetermined views may be selected analyzing multiple inputs.

Further, the system may analyze a set of "good" frames to determine whether one of the "good" frames from the video stream is considered the "best" for assignment as the image for the particular view. Selection of the frames for the set of frames may be performed in one of several ways. FIG. 7C illustrates one example of selection of good frames. As one example, the system may select a subset of "good" frames for a particular view for further analysis in order to determine whether one of the frames in the subset is to be assigned as the image for the particular view.

In particular, one or more factors may be used to determine whether a frame is considered "good" (e.g., worthy of potentially being used as an image for a particular view) or "bad" (e.g., unworthy of potentially being used as an image for a particular view). The factors may include any one, any combination, or all of: blurriness; vehicle presence; and vehicle view probability. As one example, the system may determine whether the frame at issue is blurry. A blurry score above a predetermined threshold, which may be predetermined for each view category, is indicative of a "good" frame. As another example, the system may determine whether the car presence probability is above a car presence probability threshold. In particular, a calculated car presence probability above a pre-determined car presence probability threshold is indicative of a "good" frame. As still another example, the system may determine whether the car view probability is above a predetermined car view probability threshold. In particular, a view recognizer probability above a pre-determined car view probability threshold is likewise indicative of a "good" frame. Further, in determining whether a frame is considered "good", the potential category for which the frame is being considered is compared with the category returned by car presence software. Responsive to determining that the frame does not match the category returned by the car presence software, the frame is not considered as "good" for the category returned by the car presence software.

After the capture process, the system may access a video file in mobile device's file storage area. Collections of frame information for each view category, such as illustrated in FIG. 7D, may be generated. In particular, the video recording 784 may be analyzed in order to generate collections of frame information for the front view 785, the rear view 786, and the console view 787. In this regard, the collections may be considered subsets of frames of the video stream.

As discussed above, the system may analyze data inputs from multiple sources. As one example, the system may analyze data inputs from the camera video stream and from compass data. Typically, when a person walks around a vehicle, there are multiple frames that may be acceptable for a particular perspective, such as the driver side view. In practice, the preferred orientation is when the camera is positioned "head-on" with the perspective view. An example of a "head-on" view may be defined as a vector, perpendicular to the surface of the lens of the camera, being perpendicular with the particular perspective. In another way, the lens of the camera may be parallel with the surface of the vehicle at the particular perspective. In the example of the driver side view, the user may walk from the front of the vehicle to the driver side of the vehicle and then to the rear of the vehicle. As the user walks around the vehicle, the camera captures several frames of the driver side view which may be considered acceptable. Several of these frames may be "off-angle", where the plane, as defined by the driver side of the vehicle, is not parallel to the plane as defined by the lens of the camera. The system may select the frame which more closely (or most closely) is generated when the plane defined by the driver side of the vehicle is parallel to the plane defined by the lens of the camera.

FIG. 7E illustrates one methodology 790 to determine the "better" or "best" frame for one, some, or each of the predetermined views (e.g., driver side view), such as selecting a frame which has a better (or best) "head-on" view for the particular perspective. Methodology 790 may be performed in real time, such as when the user is walking around the vehicle with the smartphone. Alternatively, methodology 790 may be performed after the completion of obtaining potential images for each of the particular perspectives. In the latter instance, as the user is walking around the vehicle, the user may be informed that images have been obtained for each particular perspective, with the selection of the "best" image for one, some or each particular perspective being performed thereafter. Thus, after completion of the video capture, the software may examine all frames that have been bookmarked as being recognized with an associated particular view, with the compass directional data being overlaid or associated with the bookmarked frames.

Bookmarking of the frames to the different particular views may be performed in one of several ways. In one way, the software may determine when the video stream has first captured a frame of the particular view, establishing one bookmark, and when the video stream has last captured a frame for the particular view, establishing the second bookmark. The timeline of the video in between the bookmarks may comprise the frames that are potentially available for the image of the particular view.

For example, with regard to capturing the image for the driver side view (moving from the front of the vehicle), the video stream is capturing the front of the vehicle and then transitions to the driver side of the vehicle. When the camera first "captures" the image of the driver side view (where the camera obtains an image of the driver side view), the image is likely not an optimal view of the driver side, being captured at an angle and not head-on. The first "capture" may be considered a first "bookmark"—indicating to the software entering into the particular view of the driver side. The video stream continues to capture frames of the driver side view until the software determines that the video stream has left the driver side view and moved to the rear of the vehicle, establishing the second "bookmark" for the driver side.

As an example, the software may determine that the video stream entered the driver side view at 4.1 seconds and exited the driver side view at 5.5 seconds, indicating the boundaries in the video stream in which to select the image for the driver side view.

The compass data, which may be associated with the bookmarked frames, indicates an absolute direction. Using mathematical analysis, discussed further below, may allow the software to determine an absolute compass direction which is more head-on view with respect to the particular view of the vehicle. Thus, the bookmarked frames for a particular view may be analyzed, focusing on the subset of bookmarked frames that meets certain criteria (such as not being blurry, includes the entire vehicle in the frame, vehicle centered in frame, etc.). Further, from the subset of bookmarked frames, frames with similar the absolute compass direction (determined to be the more or most head-on view with respect to the particular view of the vehicle) may be examined, with the highest probability in this set being selected as the frame for the particular view of the vehicle.

Referring back to FIG. 7E, at 791, the angle jump in the compass heading is corrected. In particular, the compass heading values may be normalized. The value of compass heading may range from 0 to 360. Thus, for one view, heading values (in degrees) may include the following:

. . . , 345.0, 357.2, 359.3, 2.2, 3,5, . . .

The above-values may be changed to:

. . . , 345.0, 357.2, 359.3, 362.2, 363,5, . . .

The transformation may be performed in one of several ways. In one way, the maximum heading value in the collection is determined. In order to determine whether to correct the angle in the compass heading, the following equation is used:

If |maximum_heading− heading−360|<90, then 360 is added to the heading. In one implementation, the best frame angle for a plurality of views (e.g., driver side, passenger side, front, back) are approximately 90 degrees apart. Therefore, the value of 90 is used as the comparison.

In the example above, the maximum heading is 359.3. For the compass value=2.2, the following is calculated:

|359.3−2.2−360|=2.9, which is less than 90. Therefore, 360 is added to the compass value.

At 792, the frame information is separated into clusters by compass heading.

Specifically, the frame information may be sorted, such as in increasing order, by compass heading. Then, the frame information may be grouped into a same cluster if the gap of the compass heading values between the frame information is less than a predetermined degree. In one implementation, the gap value selected is 50. Other values are contemplated. As one example, the sorted heading values may be as follows:

1, 2, 3, 5, 7, 9, 20, 40, 45, 50, 60, 80, 140, 145, 170, 200, 210

In the example of a gap value of 50, the following two clusters are obtained:

[1, 2, 3, 5, 7, 9, 20, 40, 45, 50, 60, 80], [140, 145, 170, 200, 210]

At 793, the cluster with the most number of frames is chosen. In the example above, the following cluster is chosen:

[1, 2, 3, 5, 7, 9, 20, 40, 45, 50, 60, 80]

At 794, the heading value for the best frame is predicted. In this way, the software is predicting a best directional data value for the compass. For example, the software may assign weights for each frame as follows:

Let m represent the view recognizer probability threshold and p represent the view recognizer probability of the frame.

The weight of the frame may be calculated as follows:

$(p-m)/(1.0-m)+0.1$

For example, if m (the view recognizer probability threshold) is 0.9, then the values for p (the view recognizer probability of the frame) is anywhere between 0.9 and 1.0. For example, with regard to the driver side view, the value of p calculated with respect to the driver side view is the probability that the frame is a view of the driver side. The following are examples of the calculated weights with m=0.9:

p=0.95=> weight=0.05/0.1+0.1=0.6
p=0.91=> weight=0.01/0.1+0.1=0.11
p=0.99=> weight=0.09/0.1+0.1=1.0

The value 0.1 is added to ensure the calculated weight always greater than 0.

In one implementation, the weights may be used to better distinguish a frame with good probability values from other frames with lesser values. After the weights for each frame are calculated, the software may calculate the weighted average of the compass heading. An example of the weighted average of the compass heading is shown as follows:

heading: [35.0, 40.2, 50.8, 60.2, 61.9]
weights: [0.1, 0.2, 0.99, 0.98, 0.3]
=> weighted average of the compass heading=(35.0*0.1+ 40.2*0.2+50.8*0.99+60.2*0.98+61.9*0.3)/(0.1+0.2+0.99+ 0.98+0.3)

Thus, the calculated compass heading may be an indication of the compass heading where the camera is "head-on" with the predetermined view.

There may be instances where multiple frames at the compass heading may have a high score (e.g., multiple frames at the calculated compass heading have at least a 0.99 view recognizer probability). In such an instance, the software may analyze another metric for these multiple frames (such as blur metric) in order to select the "best" frame for the particular view. For example, the software may select the frame, from the multiple best candidate frames, with the highest blur metric score.

At 795, the "best" frame is chosen. For example, among the frames, the software may choose the frame whose heading value is closest to the heading value calculated at 794 as the "best" frame for the particular view.

At 796, the frame image may be extracted from the video stream as the assigned image for the predetermined view. For example, the time bookmark of the frame chosen at 795 may be read. Using the time mark, the software may then extract the image from the video stream.

FIG. 8A illustrates an exemplary flow diagram 800 to initialize the AutoVision application. At 802, the AutoVision screen loads. At 804, AutoVision is initialized. At 806, the application determines whether there has been error. Example errors include, but are not limited to, an error in configuring the blur detector (e.g., the metal API may result in an error during initialization), an error in configuring the motion data manager (e.g., if the smartphone is not equipped to return a compass heading, this will result in an error), and/or an error that the user has not granted the app running on the smartphone the necessary permissions to use the data generated by the camera and/or sensors resident on the smartphone. Responsive to determining that there is an initialization error, at 808, the application may address the error by requesting the user to manually generate the report. Responsive to determining that there is no initialization error, at 810, the application begins capturing video frames. At 812, the data generated by the smartphone, such as the compass data generated by the compass on the smartphone, may be fetched.

Figure 8B:
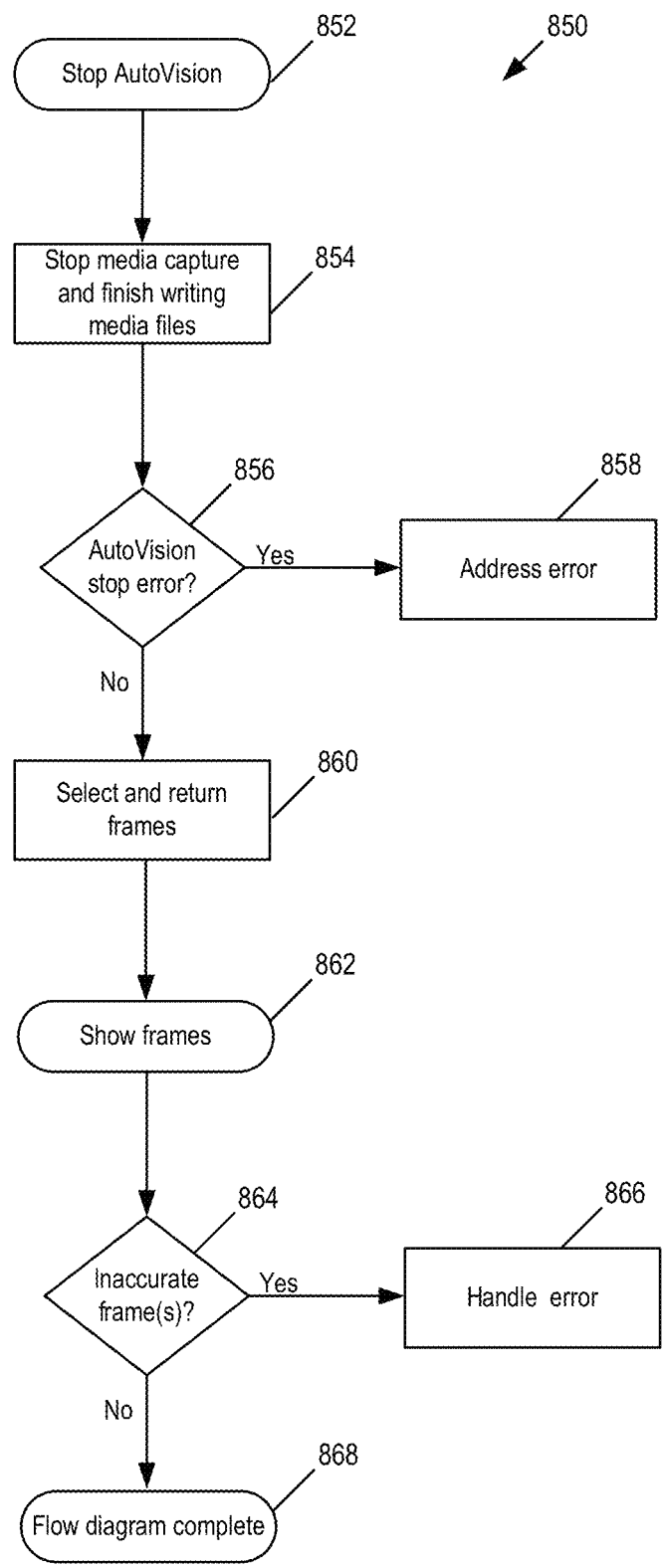
FIG. 8B illustrates an exemplary flow diagram to stop the AutoVision application.

FIG. 8B illustrates an exemplary flow diagram 850 to stop the AutoVision application. At 852, the AutoVision application is stopped. At 854, media capture is stopped and media files are finished being written to. At 856, the application determines whether there has been error. An example error includes, but are not limited to, an error while finishing recording a video or audio. Responsive to determining that there is an initialization error, at 858, the application may address the error. Responsive to determining that there is no initialization error, at 860, the application selects and returns frames. Optionally, at 862, the frames are shown. At 864, it is determined whether the frame(s) are inaccurate. If so, at 866, the error is handled. For example, responsive to determining that one or more frames are inaccurately labelled, the mislabeled images may be resolved. If not, at 868, the flow diagram is complete.

Figure 9:
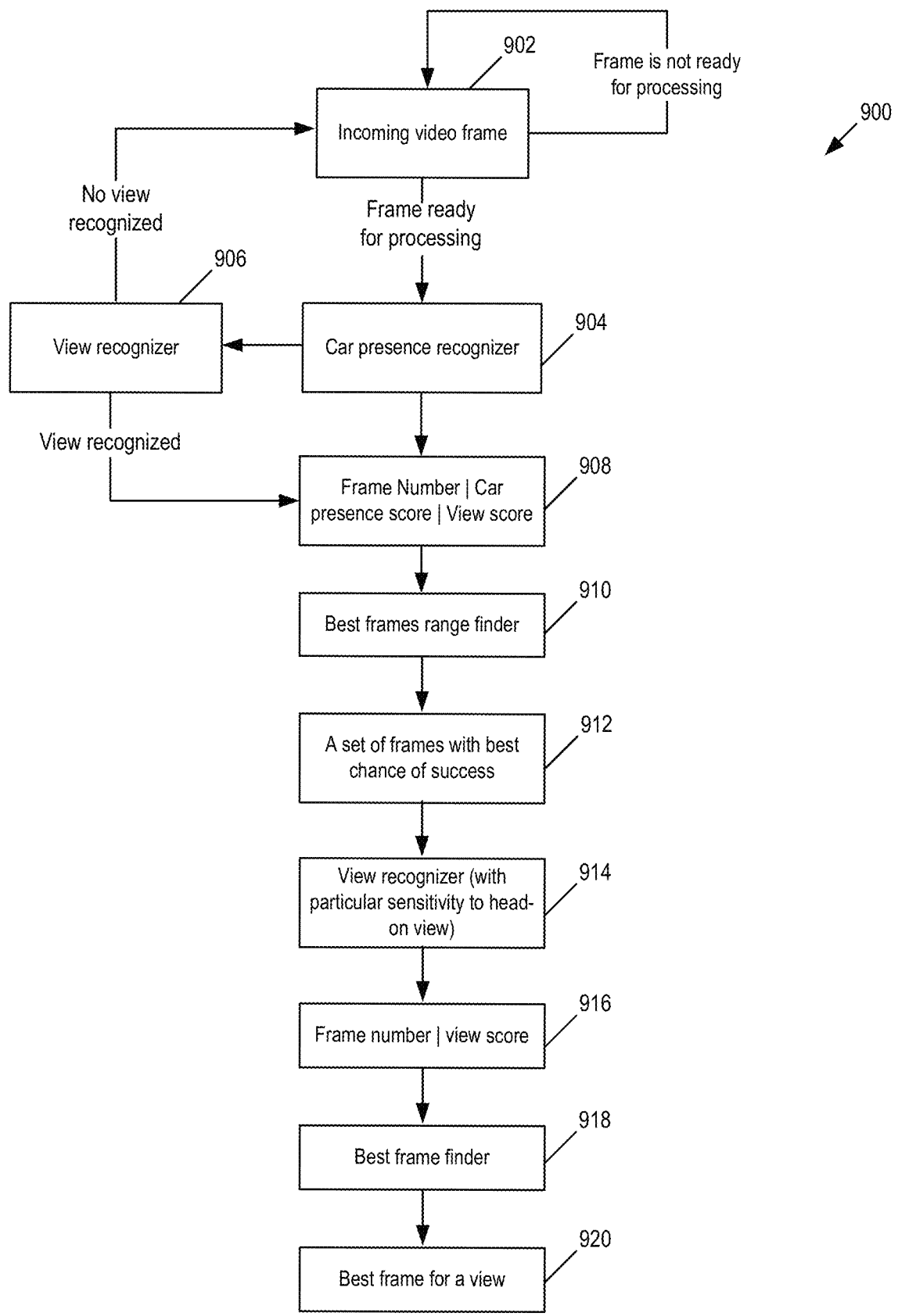
FIG. 9 illustrates an exemplary flow diagram of a video-based best frame selection workflow.

FIG. 9 illustrates an exemplary flow diagram 900 of a video-based best frame selection workflow. At 902, an incoming video frame is received. It is determined whether the frame is ready for processing or not. If the frame is not ready for processing, flow diagram 900 loops back to 902. If the frame is ready for processing, flow diagram 900 goes to 904 for the car presence recognizer (e.g., whether there is a car determined to be present in the frame). If no view is recognized, flow diagram 900 loops back to 902. If a view is recognized, flow diagram 900 moves to 908. At 908, various information is associated with a particular frame number, such as the car presence score (e.g., an indication of the likelihood that a car is present in the frame) and/or a view score (e.g., an indication of the likelihood that a predetermined view is present in the frame). At 910, the application access a range finder for the best frames (e.g., a number of frames for the range finder. At 912, the application selects a set of frames with the best chance of success. At 914, the view recognizer is used. In one implementation, criteria for selecting an image may vary for a particular view. For example, the application may seek to have a higher probability for locating a particular view, such as the head-on view, than for other views, such as an interior view. Alternatively, criteria for selecting an image does not vary based on the particular views.

At 916, the frame number is correlated to the view score for a plurality of frames. At 918, the best frame finder is accessed in order to, at 920, to identify the best frame for a particular view.

Figure 10:
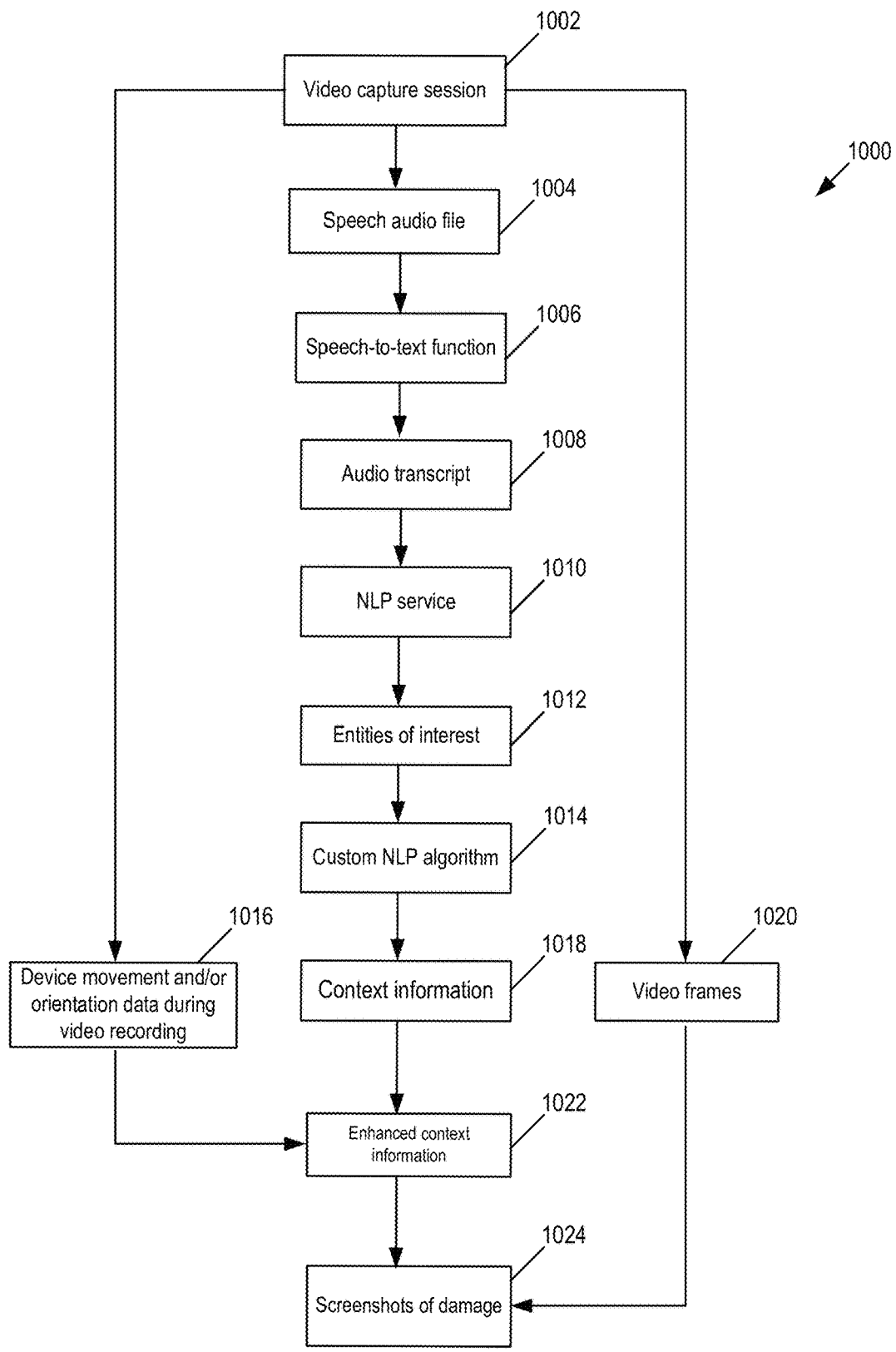
FIG. 10 illustrates an exemplary flow diagram of damage context extraction from an audio workflow.

FIG. 10 illustrates an exemplary flow diagram 1000 of damage context extraction from an audio workflow. As discussed above, audio may be used in order to characterize the condition of the vehicle, such as damage associated with the vehicle. In one implementation, the smartphone may record the video as the user is moving about and/or in the vehicle. The smartphone may extract the data from the audio channel from the video, and input the data from the audio channel to a speech-to-text software program. The speech-to-text software program may generate, based on the data from the audio channel, an audio transcript. The smartphone may then input the audio transcript to a machine-learning-based NLP service in order to extract or identify specific terms. As one example, the machine-learning-based NLP service may comprise an NLP model that is trained to identify specific terms (e.g., to identify terms such as terms related to damage (e.g., "scratch", "dent", "chip", "tear", etc.) and terms related to location on the vehicle (e.g., "door", "fender", "window", "seat", "hood", "engine", etc.). In this way, the generic machine-learning model may be augmented to identify specific terms or entities of interest. Responsive to the machine-learning-based NLP service identifying a specific term or terms (e.g., a "scratch"; "scratch" on "door") or an entity of interest, the smartphone may identify the time log, in the data from the audio channel, when the specific term was uttered or the entity of interest identified. For example, the smartphone may identify that the term "scratch" was uttered at time=5.056 seconds. As another example, the smartphone may identify that the term "scratch" was uttered at time=5.056 seconds and the term "door" was uttered at time=5.124. The smartphone may then correlate the time with an identification of the particular view of the vehicle. As discussed above, the smartphone may determine when, in the timeline, a particular view of the vehicle was entered and was exited (e.g., from time=4.505 to time=6.124, the driver side view was shown on the video). Given the identification of the time that the term was uttered and given the timeline when particular views of the vehicle are shown in the video, the smartphone may determine which, of the plurality of potential views of the vehicle, is the particular view when the term was uttered. The smartphone, in turn, may use this information in one of several ways. In one way, the smartphone may tag the specific view with the information. As one example, given that the term "scratch" was uttered when the driver side view was shown in the video, the smartphone may generally tag the image of the driver side view with "scratch". As another example, given that the terms "scratch" and "door" uttered when the driver side view was shown in the video, the smartphone may generally tag the image of the driver side view with "scratch" on the "door". In another way, the smartphone may use this information in order to automatically analyze an image. As one example, given that the term "scratch" was uttered when the driver side view was shown in the video, the smartphone may automatically analyze the image obtained for the driver side view for a scratch. As another example, given that the terms "scratch" and "door" were uttered when the driver side view was shown in the video, the smartphone may first identify a subpart of the image of the driver side view ascribed to the "door", and automatically analyze the subpart of the image for a scratch. Responsive to the smartphone identifying the scratch in the image obtained for the driver side view, the smartphone may generate an output for the user to confirm that the portion of the image (which the smartphone identified as containing a scratch) indeed is a scratch.

At 1002, a video capture session is occurring. At 1004, a speech audio file is generated from the video capture session. As discussed above, the speech audio file may be accessed from the audio channel of the video. At 1006, a speech-to-text function is used on the audio file in order to generate at 1008 an audio transcript. At 1010, a natural language processing (NLP) service may be used. In one implementation, the NLP service may rely on machine learning in order to perform language-processing tasks. At 1012, entities of interest may be identified in order, at 1014, to generate output for the custom NLP algorithm for context information at 1018. As one example, a type of damage (e.g., a "scratch") may be identified in the audio transcript. As another example, a part of the vehicle (e.g., the "door") may be identified in the audio transcript. The information may be used to generate the context information for the specified view. In this regard, the audio transcript at 1008 may be input to a custom-trained machine learning based NLP service to extract the specific terms (e.g., "scratch", "rust", "dent", etc.) that are indicative of entities of interest.

At 1016, device movement data and/or orientation data is monitored during video recording. In one implementation, various sensors, such as the GPS receiver, compass sensor, accelerometer sensor, gyroscope sensor, or the like, may generate data when the video feed is being captured. This information may be used in order to supplement or enhance the context information at 1022. As one example, device orientation data, such as using a compass built into the smartphone, may be accessed. As discussed herein, the device orientation data may be used in order to select, from a plurality of images for a specific view, the best image for the specific view. As another example, the data from the GPS receiver may be used to identify movement of the user around or relative to the vehicle. This movement may likewise be used in order for the smartphone to select the best image for the specific view.

As discussed above, the context information may be enhanced at 1022 in one or more respects. For example, any one, any combination, or all of: identification of term(s) from analysis of the audio stream; identification of orientation of the smartphone relative to the vehicle based on video analysis; or sensor data (such as generated at 1016). At 1020, video frames are stored. In particular, this branch of the flow diagram 1000 is indicative of post-processing after the smartphone has captured the video. At 1024, the screenshots of the damage are obtained.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

The following example embodiments of the invention are also disclosed:

Embodiment 1

A mobile device comprising:
a camera device configured to generate a stream of images of a vehicle;
a display; and
a controller in communication with the camera device and the display, the controller configured to:
receive the stream of images of a vehicle;
select, using a model, one or more images for a set of predetermined target views from the stream of images;
receive input as to a damage assessment of the vehicle; and
responsive to receiving the input as to the damage assessment of the vehicle:
generate an output for display on the display, the output configured to display the damage assessment relative to the vehicle in 3-dimensional space; and
modify the selected one or more images for the set of predetermined target views in order to identify the damage assessment of the vehicle.

Embodiment 2

The mobile device of embodiment 1:
wherein the stream of images comprises a video stream.

Embodiment 3

The mobile device of any of embodiments 1 and 2:
wherein a user is configured to generate the input as to the damage assessment based on tapping the display; and
wherein the controller, responsive to the tapping the display, is configured to place a marker or icon with the damage assessment on at least one of the one or more images for the set of predetermined target views.

Embodiment 4

The mobile device of any of embodiments 1-3:
wherein the controller is configured to generate one or more visual cues via the display responsive to selecting the one or more images for a set of predetermined target views from the stream of images.

Embodiment 5

The mobile device of any of embodiments 1-4:
wherein the one or more visual cues comprises at least one of: a window popping up on the display with an indication that the image of a predetermined target view has been obtained; momentary freezing of display to indicate that the image of the predetermined target view has been obtained; or displaying text on the display indicating the image of the predetermined target view has been captured and requesting one or more actions by a user of the mobile device to input information on the damage assessment.

Embodiment 6

The mobile device of any of embodiments 1-5:
wherein responsive to the user tapping the display, one or more menus is output to the display in order to obtain the damage assessment.

Embodiment 7

The mobile device of any of embodiments 1-6:
wherein the one or more menus comprises:
a first-level menu comprising a list of vehicle parts for the predetermined target view; and
responsive to selection by the user of one part in the list of vehicle parts, a second-level menu with a list of potential types of damage associated with the one part selected in the first-level menu.

Embodiment 8

The mobile device of any of embodiments 1-7:
wherein a user is configured to generate the input as to the damage assessment based on tapping the display; and
wherein the stream of images comprises a video stream; and
wherein the controller is configured to generate the output for display on the display of the damage assessment by modifying the video stream with the damage assessment.

Embodiment 9

The mobile device of any of embodiments 1-8:
wherein the controller is configured to modifying the video stream with the damage assessment by placing a tag or icon in 3-dimensional space superimposed on the video stream such that a position of the tag or icon in 3-dimensional space is at a location that was identified by the user as to where damage is on the vehicle.

Embodiment 10

The mobile device of any of embodiments 1-9:
wherein the icon or tag is configured to convey information regarding the damage assessment.

Embodiment 11

The mobile device of any of embodiments 1-10:
wherein the information regarding the damage assessment comprises information regarding a type of the damage assessment.

Embodiment 12

A method, configured to perform any of the actions of any of embodiments 1-11 or comprising means for performing and/or controlling any of embodiments 1-11.

Embodiment 13

A mobile device comprising:
a camera configured to generate a video stream;
a display;
a memory configured to store indicators for a plurality of predetermined views of a vehicle; and
a processor in communication with the camera, the display, and the memory, the processor configured to:
  access the video stream;
  determine, for a frame of the video stream, whether a specific predetermined view from the plurality of predetermined views, is present in the frame of the video stream;
  responsive to determining that the specific predetermined view is present in the frame of the video stream:
    tag the frame as an image of the specific predetermined view;
    output an indication that the image of the specific predetermined view has been obtained;
    determine whether a user has generated input, via the mobile device, indicative of damage for the specific predetermined view; and
    responsive to determining that the user has generated input indicative of damage for the specific predetermined view:
      determine at least one aspect of the damage for the specific predetermined view; and
      modify at least one of the video stream or the image of the specific predetermined view based on the determined at least one aspect of the damage for the specific predetermined view.

Embodiment 14

The mobile device of embodiment 13:
wherein the input via the mobile device indicative of damage for the specific predetermined view comprises a tap on the display; and
wherein responsive to determining that the user has tapped on the display, the processor is configured to:
  determine a location on the display of the tap;
  correlate the location to a part of the image of the specific predetermined view;
  superimpose an image icon on the part of the image of the specific predetermined view, the image icon indicative of the damage to the vehicle;
  determine, based on the location of the tap, a 3-dimensional position of the tap;
  and
  generate, for at least a predetermined time period, a video stream icon dynamically updated in space in the video stream based on the 3-dimensional position of the tap and based on a current perspective of the video stream.

Embodiment 15

The mobile device of any of embodiments 13 and 14:
wherein the specific predetermined view comprises a first specific predetermined view;
wherein the processor is further configured to, after tagging the frame as the image of the first specific predetermined view:
determine, for another frame of the video stream, whether a second specific predetermined view from the plurality of predetermined views, is present in the another frame of the video stream;
responsive to determining that the second specific predetermined view is present in the another frame of the video stream:
tag the another frame as an image of the second specific predetermined view;
output an indication that an image of the second specific predetermined view has been obtained;
determine whether the user has generated input via the mobile device indicative of damage for the second specific predetermined view; and
responsive to determining that the user has generated input indicative of damage for the second specific predetermined view:
determine at least one aspect of the damage for the second specific predetermined view; and
modify at least one of the video stream or the image of the second specific predetermined view based on the determined at least one aspect of the damage for the second specific predetermined view.

Embodiment 16

The mobile device of any of embodiments 13-15:
wherein the processor is configured to determine whether the user has generated input via the mobile device indicative of damage for the first specific predetermined view after tagging the frame as the image of the first specific predetermined view and before tagging the another frame as the image of the second specific predetermined view.

Embodiment 17

The mobile device of any of embodiments 13-16:
wherein the processor is configured to exit damage input mode in order to input damage for the first specific predetermined view responsive to tagging the another frame as the image of the second specific predetermined view.

Embodiment 18

The mobile device of any of embodiments 13-17:
wherein the input via the mobile device indicative of damage for the specific predetermined view comprises audio input, wherein the audio input comprises a part of the video stream.

Embodiment 19

The mobile device of any of embodiments 13-18:
wherein, responsive to the audio input, the processor is configured to:
analyze the audio input in order to identify for one or more keywords indicative of damage to the vehicle; and
responsive to identifying the one or more keywords indicative of damage to the vehicle, analyze the image of the specific predetermined view in order to identify a part of the image indicative of damage.

Embodiment 20

The mobile device of any of embodiments 13-19:
wherein the display comprises a touchscreen display; and
wherein the input via the mobile device indicative of damage for the specific predetermined view comprises an indication of a tap on the touchscreen display.

Embodiment 21

The mobile device of any of embodiments 13-20:
wherein the processor is configured to determine, based on the tap on the touchscreen display:
a 2-D location in the image of the specific predetermined view at which to place a 2-D damage icon on the image of the specific predetermined view, the 2-D damage icon indicative of damage at the specific predetermined view of the vehicle; and
a 3-D location in 3-D space at which to place a 3-D damage icon in 3-D space superimposed on the video stream subsequent to the tap on the touchscreen display.

Embodiment 22

The mobile device of any of embodiments 13-21:
wherein, responsive to the tap on the touchscreen, the processor is configured to output one or more menus on the touchscreen to solicit damage input; and
responsive to the user providing the damage input via the one or more menus, the processor is configured to select the 2-D damage icon and the 3-D damage icon.

Embodiment 23

The mobile device of any of embodiments 13-22:
wherein the damage input comprises a type of damage; and
wherein the 2-D damage icon and the 3-D damage icon are selected based on the type of damage.

Embodiment 24

The mobile device of any of embodiments 13-23:

What is claimed is:
1. A mobile device comprising:
a camera configured to generate a video stream;
a display;
a memory configured to store indicators for a plurality of predetermined views of a vehicle; and
a processor in communication with the camera, the display, and the memory, the processor configured to:
access the video stream;
determine, for a frame of the video stream, whether a specific predetermined view from the plurality of predetermined views, is present in the frame of the video stream;
responsive to determining that the specific predetermined view is present in the frame of the video stream:

identify the frame as an image of the specific predetermined view;
output an indication that the image of the specific predetermined view has been obtained;
responsive to identifying the frame as the image of the specific predetermined view, analyze sensor data indicative of a position of the mobile device relative to the vehicle in order to determine whether the mobile device has moved closer to the vehicle since the camera generated the frame; and
responsive to determining that the mobile device has moved closer to the vehicle, determine, based on the determined specific predetermined view, at least one aspect of damage for the specific predetermined view.

2. The mobile device of claim 1, wherein the processor is configured to determine, based on the determined specific predetermined view, the at least one aspect of the damage for the specific predetermined view by:
accessing a damage model that correlates the determined specific predetermined view to potential types of damage; and
determining a type of damage using the accessed damage model and selected from the potential types of damage.

3. The mobile device of claim 1, wherein the processor is further configured to receive an indication of damage from a user of the mobile device; and
wherein the processor is configured to determine the at least one aspect of the damage for the specific predetermined view based on both the specific predetermined view and the indication of damage from the user of the mobile device.

4. The mobile device of claim 3, wherein the indication of damage from the user of the mobile device comprises an indication of a location of damage in the specific predetermined view; and
wherein the processor is configured to determine the at least one aspect of the damage for the specific predetermined view based on the specific predetermined view by determining a type of damage at the location of damage in the specific predetermined view.

5. The mobile device of claim 1, wherein the specific predetermined view comprises a first specific predetermined view;
wherein the processor is further configured, after identifying the frame as the image of the first specific predetermined view but before identifying another frame as an image of a second specific predetermined view, to receive damage input from a user of the mobile device; and
wherein the processor is configured, responsive to receiving the damage input, to assess damage, based on the damage input, to the first specific predetermined view.

6. The mobile device of claim 5, wherein the damage input comprises input indicative of location of damage and input indicative of type of damage; and
wherein the processor is configured to assess the location of damage in the specific predetermined view based on the input indicative of the location of damage and the type of damage in the specific predetermined view based on the input indicative of type of damage.

7. The mobile device of claim 1, wherein the processor is configured to determine, based on the determined specific predetermined view, the at least one aspect of damage for the specific predetermined view by:
responsive to determining that the specific predetermined view is present in the frame of the video stream:
generating a list of potential options for damage for the specific predetermined view; and
receiving user input of at least one potential option in the list of potential options.

8. The mobile device of claim 7, wherein the processor is configured to:
automatically analyze the frame of the video stream in which the specific predetermined view is present;
reduce, using the automatic analysis of the frame of the video stream, a potential list of options for damage in the frame of the video stream to generate a reduced list of one or more reduced options to present to a user;
present, on the display, the reduced list of one or more reduced options to the user; and
receive input from the user for at least one of the one or more reduced options.

9. The mobile device of claim 8, wherein the processor is configured to reduce the potential list of options to generate a reduced list of at least two reduced options to present to the user; and
wherein the processor is configured to receive input as to one of the at least two reduced options presented to the user.

10. The mobile device of claim 8, wherein the processor is configured to automatically analyze the frame of the video stream using machine learning.

11. The mobile device of claim 1, further comprising a motion sensor configured to generate motion sensor data;
wherein the processor is further configured to enter damage input mode responsive to analyzing the motion sensor data generated by the motion sensor resident on the mobile device;
wherein processor is configured to determine the at least one aspect of damage responsive to entering damage input mode;
wherein the processor is further configured to identify a frame as an image of another predetermined view separate from the specified predetermined view; and
wherein, responsive to identifying the frame as the image of the another predetermined view separate from the specified predetermined view, the processor is further configured to exit the damage input mode.

12. The mobile device of claim 1, wherein the processor is configured to determine, based on the determined specific predetermined view, the at least one aspect of damage for the specific predetermined view by:
generating on the display a first-level menu indicative of a list of vehicle parts for the specific predetermined view;
receiving a selection of one of the list of vehicle parts for the specific predetermined view;
generating on the display a second-level menu of a types of damage associated with the one of the list of vehicle parts selected; and
receiving a selection of one of the types of damage associated with the one of the list of vehicle parts selected.

13. The mobile device of claim 1, further comprising a sensor configured to generate the sensor data indicative of the position of the mobile device relative to the vehicle.

14. The mobile device of claim 13, wherein the sensor comprises an accelerometer configured to generate the sensor data indicative of the position of the mobile device relative to the vehicle;
wherein, responsive to identifying the frame as the image of the specific predetermined view, the processor is configured to analyze the sensor data generated by the accelerometer in order to determine whether the mobile device has moved closer to the vehicle;

wherein, responsive to determining that the mobile device has moved closer to the vehicle, the processor is further configured to enter damage input mode; and wherein, responsive to entering the damage input mode, the processor is configured to determine the at least one aspect of damage.

15. The mobile device of claim 1, wherein the processor is configured to analyze the sensor data by analyzing the video stream generated by the camera.

16. The mobile device of claim 1, wherein the processor is further configured to enter damage input mode with regard to the specific predetermined view responsive to determining that the mobile device has moved closer to the vehicle since the camera generated the frame.

17. A mobile device comprising:
a camera configured to generate a video stream;
a display;
a memory configured to store indicators for a plurality of predetermined views of a vehicle; and
a processor in communication with the camera, the display, and the memory, the processor configured to:
  access the video stream;
  determine, for a frame of the video stream, whether a specific predetermined view from the plurality of predetermined views, is present in the frame of the video stream;
  responsive to determining that the specific predetermined view is present in the frame of the video stream:
    identify the frame as an image of the specific predetermined view;
    output an indication that the image of the specific predetermined view has been obtained; and
    determine, based on the determined specific predetermined view, at least one aspect of damage for the specific predetermined view by:
      determining whether the specific predetermined view comprises an exterior predetermined view or an interior predetermined view;
      responsive to determining that the specific predetermined view comprises an exterior predetermined view, analyzing the image of the specific predetermined view limited to damage for an exterior of the vehicle; and
      responsive to determining that the specific predetermined view comprises an interior predetermined view, analyzing the image of the specific predetermined view limited to damage for an interior of the vehicle.

18. The mobile device of claim 17, wherein the processor is configured to analyze the image of the specific predetermined view limited to damage for an exterior of the vehicle by:
accessing a plurality of potential types of damage to the exterior of the vehicle; and
analyzing the image in order to reduce the plurality of potential types of damage to the exterior of the vehicle.

19. The mobile device of claim 18, wherein the processor is configured to analyze the image in order to reduce the plurality of potential types of damage to the exterior of the vehicle by analyzing the image to reduce a number of potential types of damage to the exterior of the vehicle to be less than the plurality and to be at least two potential types of damage; and wherein the processor is further configured:
present to a user of the mobile device the at least two potential types of damage for the user to select from; and
receive a selection from the user from the at least two potential types of damage.

20. A mobile device comprising:
a camera configured to generate a video stream;
a display;
a memory configured to store indicators for a plurality of predetermined views of a vehicle; and
a processor in communication with the camera, the display, and the memory, the processor configured to:
  access the video stream;
  determine, for a frame of the video stream, whether a specific predetermined view from the plurality of predetermined views, is present in the frame of the video stream;
  responsive to determining that the specific predetermined view is present in the frame of the video stream:
    identify the frame as an image of the specific predetermined view;
    output an indication that the image of the specific predetermined view has been obtained; and
    determine, based on the determined specific predetermined view, at least one aspect of damage for the specific predetermined view by:
      receiving, via the display, a first user input from a user indicative of a location of damage in the specific predetermined view;
      identifying a portion of the frame that is at or around the location of damage manually input from the user;
      receiving a second user input from the user indicative of a type of damage; and
      automatically analyzing at least the portion of the frame in order to identify the type of damage in the specific predetermined view,
      wherein automatically analyzing the at least the portion of the frame is configured to output at least two options of different types of damage and wherein the second user input selects the type of damage from the at least two options of different types of damage that is output; or
      wherein automatically analyzing the at least the portion of the frame is configured to use both of the first user input and the second user input in identifying the type of damage in the specific predetermined view.

21. The mobile device of claim 20, wherein the specific predetermined view is segmented into a plurality of different sections;
wherein the first user input comprises a user tap on the display;
wherein the processor is configured, based on the user tap, to identify one of the plurality of different sections of the specific predetermined view; and
wherein the processor is configured to analyze the one of the plurality of different sections of the specific predetermined view to determine the type of damage in the specific predetermined view.

22. The mobile device of claim 20, wherein the first user input comprises a user tap on the display, the user tap indicative of spatial coordinates; and
wherein the processor is configured to analyze the frame using the spatial coordinates to determine the type of damage in the specific predetermined view.

23. The mobile device of claim 20, wherein the first user input comprises a user tap on the display; and
   wherein the processor is configured to analyze, using the location of damage in the specific predetermined view, the frame to determine a type of damage in the specific predetermined view by:
   analyzing potential damage at the location associated with the user tap in order to generate, from a plurality of potential types of damage, a narrower set of potential types of damage in order to present to the user for selection.

24. The mobile device of claim 20, wherein the second user input comprises an audio input.

25. The mobile device of claim 24, wherein the audio input is indicative of a user's assessment of the damage; and
   wherein the automatic analysis is configured to use both of the first user input and the audio input in order to confirm or dispute the user's assessment of the damage.

26. The mobile device of claim 20, wherein the first user input comprises a tap on the display indicative of the location of the damage in the specific predetermined view; and
   wherein the second user input comprises a user selection of the type of damage from the at least two options of different types of damage that is output on the display.

* * * * *